(12) United States Patent
Suzuki et al.

(10) Patent No.: US 9,806,305 B2
(45) Date of Patent: Oct. 31, 2017

(54) BATTERY, ELECTRONIC DEVICE, ELECTRIC VEHICLE, ELECTRICAL STORAGE DEVICE, ELECTRICAL STORAGE SYSTEM AND WEARABLE TERMINAL

(71) Applicant: Sony Corporation, Tokyo (JP)

(72) Inventors: Eiichiro Suzuki, Fukushima (JP); Masaaki Sugiyama, Fukushima (JP)

(73) Assignee: Sony Corporation, Tokyo (JP)

( * ) Notice: Subject to any disclaimer, the term of this patent is extended or adjusted under 35 U.S.C. 154(b) by 358 days.

(21) Appl. No.: 14/627,135

(22) Filed: Feb. 20, 2015

(65) Prior Publication Data
US 2015/0263318 A1  Sep. 17, 2015

(30) Foreign Application Priority Data

Mar. 11, 2014 (JP) .................................. 2014-047390
Oct. 16, 2014 (JP) .................................. 2014-211971

(51) Int. Cl.
| B60L 1/00 | (2006.01) |
|---|---|
| H01M 2/10 | (2006.01) |
| B60L 11/18 | (2006.01) |
| H01M 2/02 | (2006.01) |
| H01M 2/30 | (2006.01) |
| H02J 7/00 | (2006.01) |

(52) U.S. Cl.
CPC ....... *H01M 2/1016* (2013.01); *B60L 11/1851* (2013.01); *H01M 2/024* (2013.01); *H01M 2/026* (2013.01); *H01M 2/028* (2013.01); *H01M 2/0217* (2013.01); *H01M 2/0262* (2013.01); *H01M 2/0267* (2013.01); *H01M 2/0282* (2013.01); *H01M 2/1022* (2013.01); *H01M 2/1061* (2013.01); *H01M 2/1072* (2013.01); *H01M 2/30* (2013.01); *H02J 7/0029* (2013.01); *H02J 7/0042* (2013.01); *H02J 7/0047* (2013.01)

(58) Field of Classification Search
CPC .................................................. H01M 2/1016
See application file for complete search history.

(56) References Cited

U.S. PATENT DOCUMENTS

2014/0023906 A1* 1/2014 Hashimoto ......... H01M 2/1077
429/120

* cited by examiner

*Primary Examiner* — Daniel Puentes
(74) *Attorney, Agent, or Firm* — K&L Gates LLP

(57) ABSTRACT

A battery is provided including a battery cell having main top and bottom surfaces, and a plurality of side surfaces; and at least one resin section including a cured resin that covers at least three of the plurality of side surfaces of the battery cell, but that does not cover substantially all of the top and bottom surfaces of the battery cell.

25 Claims, 16 Drawing Sheets

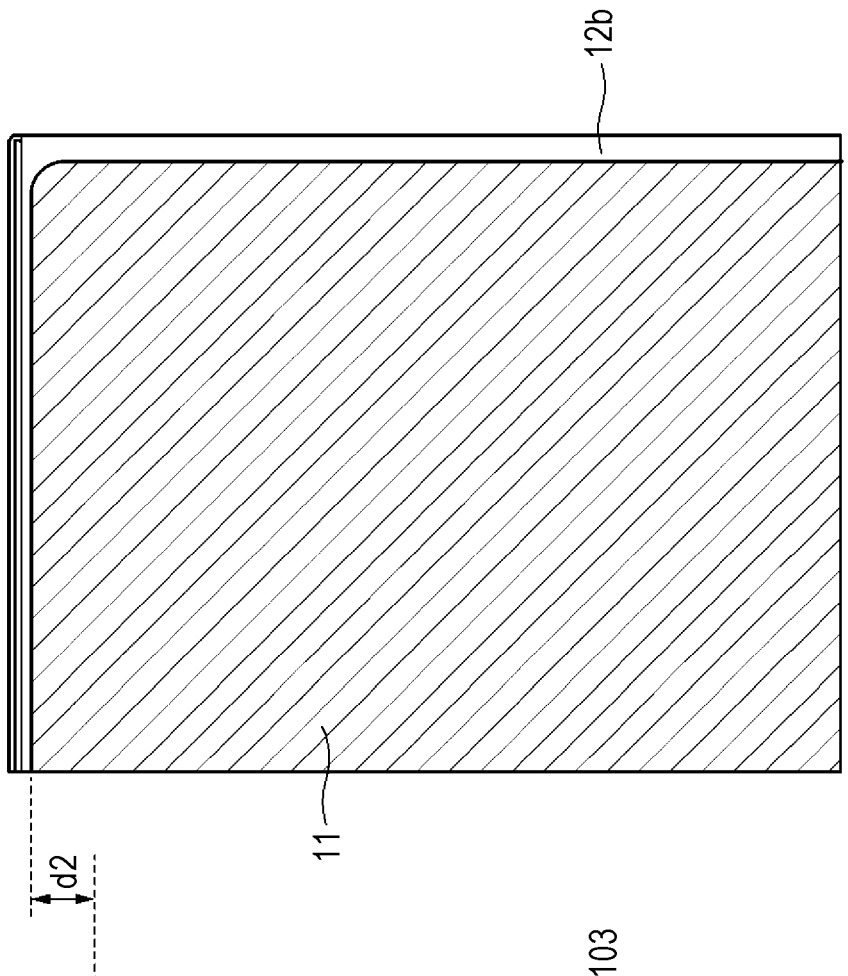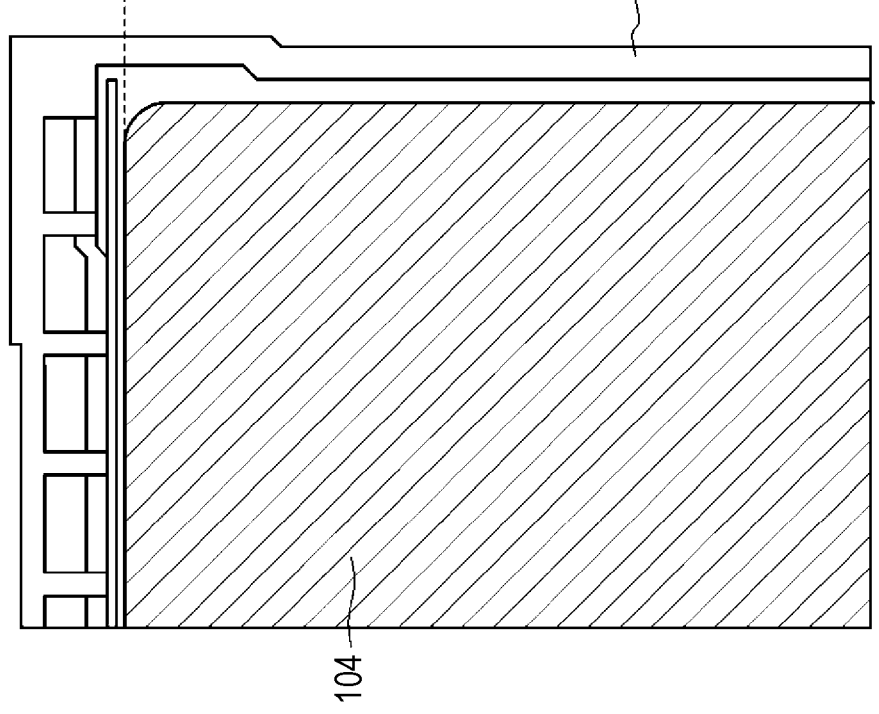

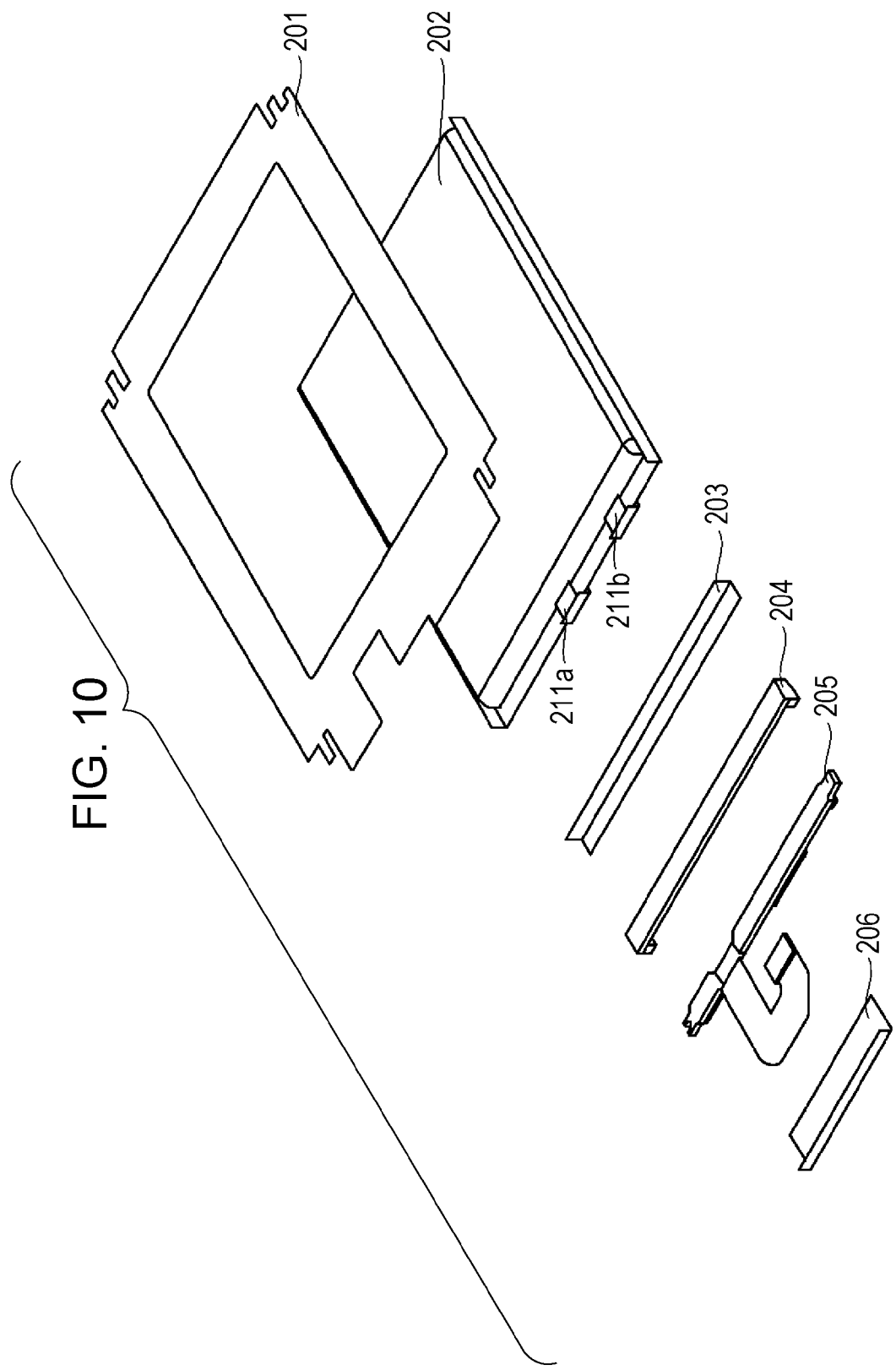

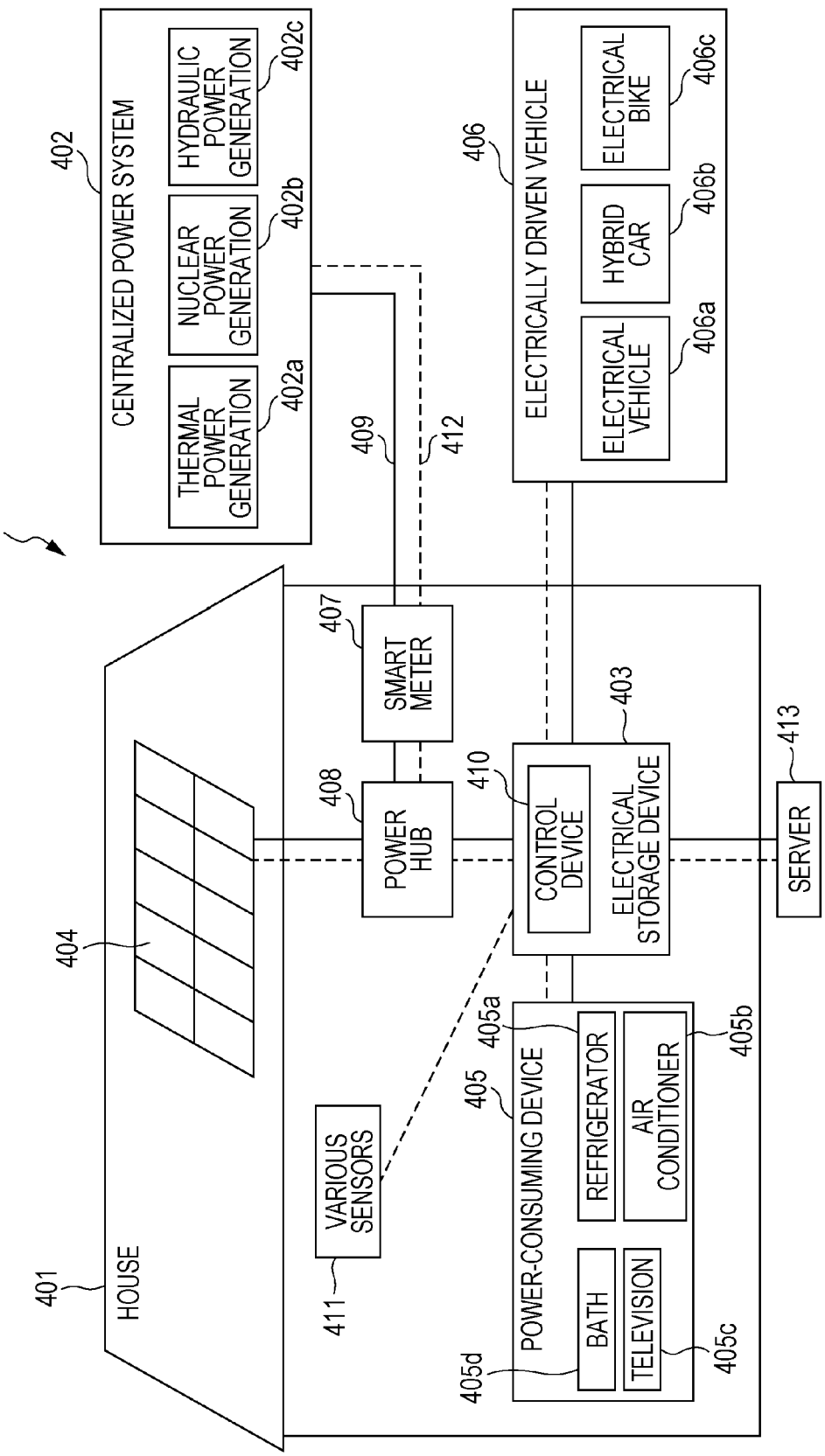

BATTERY, ELECTRONIC DEVICE, ELECTRIC VEHICLE, ELECTRICAL STORAGE DEVICE, ELECTRICAL STORAGE SYSTEM AND WEARABLE TERMINAL

CROSS REFERENCES TO RELATED APPLICATIONS

The present application claims priority to Japanese Priority Patent Application JP 2014-047390 filed in the Japan Patent Office on Mar. 11, 2014, and Japanese Priority Patent Application JP 2014-211971 filed in the Japan Patent Office on Oct. 16, 2014, the entire content of which is hereby incorporated by reference.

BACKGROUND

The present disclosure relates to a battery, an electronic device, an electric vehicle, an electrical storage device, an electrical storage system and a wearable terminal.

Recently, portable electronic apparatuses such as a note-type personal computer (PC) and a cellular phone apparatus have become widespread, and a lithium ion secondary battery, which has advantages of high voltage, high energy density, and reduction in size, has been used as a power supply of such portable electronic apparatuses.

The lithium ion secondary battery has been used widely as a battery pack in which a circuit such as a protective circuit is applied to a battery cell in which a battery element is packaged with an exterior laminate film. As battery pack-related technologies, technologies disclosed in Japanese Unexamined Patent Application Publication Nos. 2008-300245, 2004-335387, 2013-152935, 2011-003294, and 2009-181802 have been suggested.

SUMMARY

In the battery pack, it is demanded to increase the energy density per volume.

Accordingly, it is desirable to provide a battery pack capable of increasing an energy density per volume, and an electronic apparatus and a wearable terminal which use the battery pack.

In an embodiment, a battery is provided including a battery cell having main top and bottom surfaces, and a plurality of side surfaces; and at least one resin section including a cured resin that covers at least three of the plurality of side surfaces of the battery cell, but that does not cover substantially all of the top and bottom surfaces of the battery cell.

In another embodiment, a battery includes a battery cell having main top and bottom surfaces, a plurality of side surfaces, and a plurality of corners. The battery also includes at least one resin section including a cured resin that covers portions of at least two corners of the battery cell, but that does not cover substantially all of the top and bottom surfaces of the battery cell.

In another embodiment, a battery includes a battery cell having a plurality of side surfaces and at least one curved surface connecting the side surfaces, and at least one resin section that covers the side surfaces of the battery cell, but that does not cover at least substantially all of the curved surface of the battery cell. According to an embodiment of the present disclosure, there is provided a battery pack including a battery cell, a substrate section that is connected to the battery cell, and one or more resin sections which include a cured material of a curable resin composition sheet, and which come into close contact with a close contact portion including at least a part of the battery cell, or at least a part of the battery cell and at least a part of the substrate section. The curable resin composition sheet is a thermosetting resin composition sheet or an energy beam curable resin composition sheet.

According to other embodiments of the present disclosure, there are provided an electronic apparatus and a wearable terminal which include the battery pack.

According to the present disclosure, it is possible to increase the energy density per volume.

Additional features and advantages are described herein, and will be apparent from the following Detailed Description and the figures.

BRIEF DESCRIPTION OF THE FIGURES

FIG. 9A is a schematic view illustrating a region surrounded by dotted lines when viewed from a direction of an arrow Q1 in FIG. 7A, and FIG. 9B is a schematic view illustrating a region surrounded by dotted lines when viewed from a direction of an arrow Q2 in FIG. 7B;

FIG. 10 is an exploded perspective view of a battery pack using a tape;

FIG. 15 is a schematic view illustrating an example of an electrical storage system for a house to which the present disclosure is applied;

DETAILED DESCRIPTION

Figure 1:
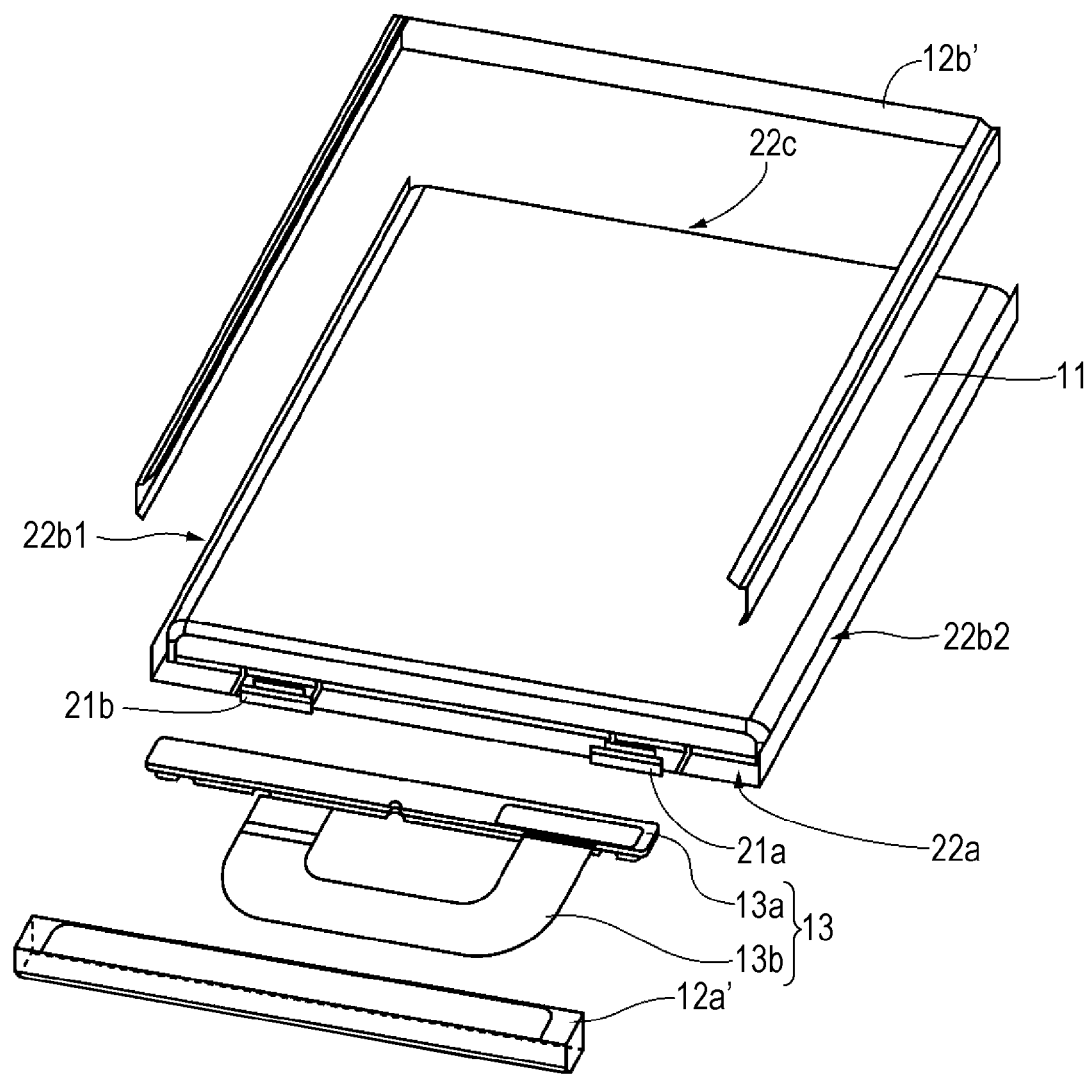
FIG. 1 is an exploded perspective view illustrating a configuration example of a battery pack according to a first embodiment of the present disclosure.

Embodiments of the present application will be described below in detail with reference to the drawings.

Summary of Present Disclosure

Summary of the present disclosure will be described for easy understanding of the present disclosure. Typical battery packs (refer to Japanese Unexamined Patent Application Publication Nos. 2008-300245, 2004-335387, 2013-152935, 2011-003294, and 2009-181802) can be largely classified into a battery pack to which an accommodation member is applied, a battery pack to which resin molding is applied, and a battery pack to which the accommodation member and the resin molding are applied.

The battery pack to which the accommodation member is applied is a battery pack in which a battery cell and a protective circuit substrate are accommodated in an accommodation member such as a holder and are fixed therein (Japanese Unexamined Patent Application Publication No. 2013-152935).

The battery pack to which the resin molding is applied is a battery pack in which at least a part of the battery cell, the protective circuit substrate, and the like is covered with a resin by the resin molding, and these components are integrated with each other (Japanese Unexamined Patent Application Publication Nos. 2004-335387, 2011-003294, and 2009-181802).

The battery pack to which the resin molding and the accommodation member are applied is a battery pack in which the battery cell, the protective circuit substrate, and the like are accommodated in the accommodation member such as the holder, and the resin molding and the like are performed, whereby a resin, the battery cell, the protective circuit substrate, and the like are integrated with the accommodation member (Japanese Unexamined Patent Application Publication No. 2008-300245).

The typical battery packs have the following problems. In the battery pack to which the resin molding is applied, and the battery pack to which the resin molding and the accommodation member are applied, there is a concern that insulation properties of an intended site may be unstable due to a variation in molding conditions. In the battery pack to which the resin molding is applied, and the battery pack to which the resin molding and the accommodation member are applied, facility investment increases, and thus it is difficult to prepare the battery packs at low cost. In the battery pack to which the resin molding is applied, there is a concern that strength may be unstable due to variation in molding conditions. In the battery pack to which the resin molding is applied, and the battery pack to which the resin molding and the accommodation member are applied, there is a concern that dimensional accuracy may be unstable due to variation in molding conditions. In the battery pack to which the accommodation member is applied, there is a trade-off limit between large capacity and securement of strength. In the battery pack to which the resin molding is applied, there is a problem in that a production process depends on a molding cycle. In the battery pack to which the resin molding is applied, a large dimensional tolerance of the battery cell has an effect on a quality thereof In the battery pack to which the resin molding is applied, design restriction conditions become strict.

The present inventors have made a thorough investigation in consideration of the above-described problems in typical battery packs, and as a result, they have found that in a case where the following characteristics of a curable resin composition sheet are utilized and the characteristics are used for exterior packaging of the battery cell or member fixing, this case is effective for solving the above-described problems. In addition, in this specification, the curable resin composition represents a thermosetting resin composition or an energy beam curable resin composition.

The curable resin composition sheet can be easily processed into a shape conforming to a portion to which the curable resin composition sheet adheres. Temporary adhesion of the curable resin composition sheet can be simply performed by sticking the curable resin composition sheet with a low pressure, and thus the curable resin composition sheet can reliably adhere to a site at which strength performance is desired to be secured. In addition, the thermosetting resin composition sheet can be melted only when being left as is in a constant temperature environment after adhesion, and then can be cured. The curable resin composition after curing has appropriate hardness, and is not easily peeled off from an adhering portion. On the other hand, the curable resin composition after curing may be adjusted to have appropriate flexibility by performing component adjustment or adjustment of curing conditions (heating conditions, irradiation time, and the like).

In the battery pack according to an embodiment of the present disclosure to which the curable resin composition sheet having the characteristics is applied, it is possible to solve the above-described problems as described below.

In the battery pack according to the embodiment of the present disclosure, a molding process is not necessary, and thus a necessary amount of a curable resin composition sheet can be integrated with a necessary site of the battery cell in the same manner as a label. Accordingly, it is possible to suppress insulation properties of an intended site from becoming unstable due to a variation in molding conditions.

In the battery pack according to the embodiment of the present disclosure, the battery pack is prepared by a process of sticking the curable resin composition sheet in the same manner as a label, and curing the curable resin composition sheet, and thus the facility for producing a typical battery pack is applicable. Accordingly, it is possible to suppress an increase in facility investment for preparation of the battery pack according to the embodiment of the present disclosure.

It is easy to obtain a desired curable resin composition sheet by processing the curable resin composition into a sheet shape. Accordingly, differently from the battery pack to which the resin molding is applied, in the battery pack according to the embodiment of the present disclosure, strength failure due to molding conditions does not occur.

The battery pack according to the embodiment of the present disclosure has a structure in which the curable resin composition processed to have a sheet shape is integrated with a battery cell, and thus it is possible to raise a design limit value based on an increase in capacity and securement of strength, and thus it is possible to further improve the capacity and the strength.

A process of producing a battery pack according to the embodiment of the present disclosure does not include a molding process. According to this, in the battery pack according to the embodiment of the present disclosure, a problem caused by the molding process does not occur. In addition, with regard to the battery pack to which the resin molding is applied, restrictions on design and manufacturing due to a large dimensional tolerance of the battery cell can be solved by removing the molding process by using the curable resin composition sheet.

Hereinafter, embodiments of the present disclosure will be described with reference to the attached drawings. In addition, description will be given in the following order.
1. First Embodiment (First Example of Battery Pack)
2. Second Embodiment (Second Example of Battery Pack)
3. Third Embodiment (Example of Electrical Storage System, and the like)
4. Other Embodiments (Modification Examples)

In addition, embodiments and the like to be described below are appropriate specific examples of the present disclosure, and the contents of the present disclosure are not limited to the embodiments and the like. In addition, effects described in this specification are illustrative only, and it is not intended to deny presence of effects different from the illustrated effect.

1. First Embodiment

Figure 2:
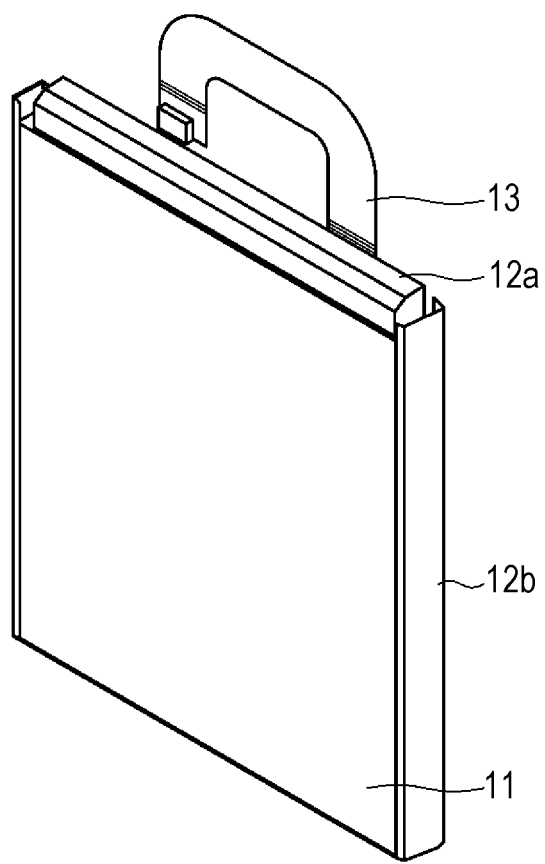
FIG. 2 is a perspective view illustrating an external appearance of the battery pack according to the first embodiment of the present disclosure.

A configuration example of a battery pack according to a first embodiment of the present disclosure will be described. FIG. 1 is an exploded perspective view illustrating a configuration example of the battery pack according to the first embodiment of the present disclosure. FIG. 2 is a perspective view illustrating external appearance of the battery pack according to the first embodiment of the present disclosure.

As illustrated in FIGS. 1 and 2, the battery pack according to the first embodiment of the present disclosure includes a battery cell 11, resin sections 12a and 12b, and a substrate section 13. The resin section 12a is obtained when a curable resin composition sheet 12a' is cured. The resin section 12b is obtained when a curable resin composition sheet 12b' is cured.

In addition, in the following description, in a case where the resin section 12a and the resin section 12b are not discriminated, the resin sections 12a and 12b will be collectively described as a resin section 12. The battery pack according to the first embodiment of the present disclosure includes one or more resin sections 12. Similarly, in a case where the curable resin composition sheet 12a' and the curable resin composition sheet 12b' are not discriminated, the curable resin composition sheets 12a' and 12b' are collectively described as a curable resin composition sheet 12'. In FIG. 1, the curable resin composition sheet 12' having a shape before curing of the resin section 12 illustrated in FIG. 2 is illustrated.

A lead 21a and a lead 21b of the battery cell 11 are connected to the substrate section 13. In addition, the resin section 12a comes into close contact with a close contact portion including at least a part of the battery cell 11 and at least a part of the substrate section 13, and the resin section 12b comes into close contact with a close contact portion including at least a part of the battery cell 11, thereby obtaining a battery pack having the external appearance illustrated in FIG. 2.

Hereinafter, details of the configuration of the battery pack will be described.

Battery Cell

Typical examples of the battery cell 11 include a laminated film type secondary battery and the like. Examples of the secondary battery include a nonaqueous electrolyte secondary battery such as a lithium ion secondary battery, and the like. In the present disclosure, the lithium ion secondary battery also includes a secondary battery in which Li segregates at a negative electrode during charging similar to a case where for example, a lithium metal is used for the negative electrode. In addition, the battery cell 11 may be constituted by a secondary battery other than the lithium ion secondary battery. In the following description, description will be given to an example in which the battery cell 11 is constituted by a laminated film type lithium ion secondary battery.

Figure 3A:
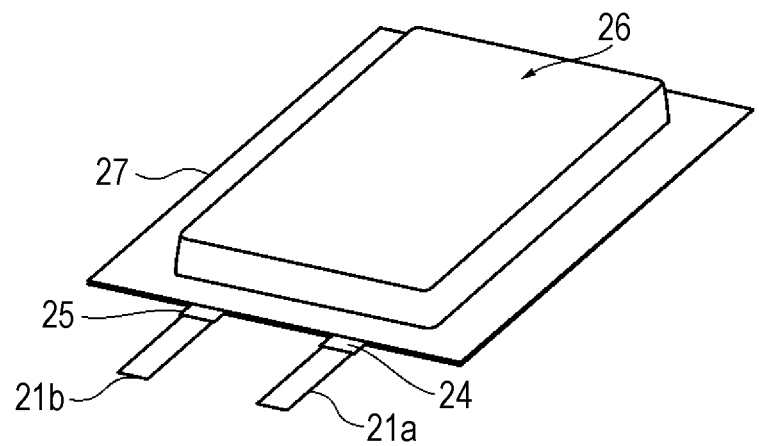
FIG. 3A is a perspective view illustrating an external appearance of the battery cell.
Figure 3B:
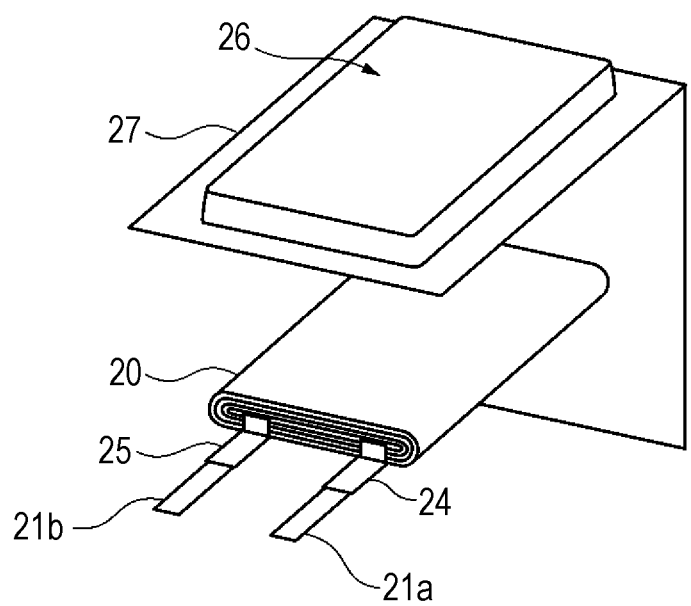
FIG. 3B is an exploded perspective view illustrating a configuration example of the battery cell.

As illustrated in FIGS. 3A and 3B, the battery cell 11 includes a battery element 20, an exterior material 27 that packages the battery element 20, leads 21a and 21b which are connected to the battery element 20, and adhesive films 24 and 25. The lead 21a is a positive electrode side lead that is connected to, for example, a positive electrode. The lead 21b is a negative electrode side lead that is connected to, for example, a negative electrode.

As illustrated in FIG. 3B, after the battery element 20 is accommodated in an accommodation portion 26 provided to the exterior material 27, three sides except for a side that is folded back are sealed with thermal fusion and the like. The adhesive film 24 is provided between the lead 21 a and the exterior material 27, and the exterior material 27 and the lead 21a are fused to each other through the adhesive film 24. Similarly, the adhesive film 25 is provided between the lead 21b and the exterior material 27, and the exterior material 27 and the lead 21b are fused to each other through the adhesive film 25. In this manner, the battery cell 11 having the external appearance illustrated in FIG. 3A is obtained. In addition, a member having a shape in which the battery element 20 is accommodated in the exterior material 27 and is not connected to the substrate section 13 is referred to as the battery cell 11.

Battery Element

The battery element 20 includes a positive electrode, a negative electrode, and a separator and/or an electrolyte which are disposed between the positive electrode and the negative electrode. For example, the electrolyte is an electrolyte in which an electrolytic solution is retained by a polymer compound, and the like, and examples thereof include a gel-shaped electrolyte.

A shape of the battery element 20 is, for example, a flat shape and the like. For example, the battery element 20 has a structure in which a strip-shaped positive electrode and a strip-shaped negative electrode are laminated through the electrolyte and/or separator, and are wound in a longitudinal direction. The lead 21a and the lead 21b are connected to the positive electrode and the negative electrode, respectively. In addition, in the case of using an electrolytic solution, which is a liquid electrolyte, as the electrolyte, the electrolyte is not laminated, the battery element 20 is impregnated in an electrolytic solution filled inside the exterior material 27. However, the battery element 20 may have a structure in which electrodes are laminated. Examples of the battery element 20 include a battery element having a structure in which the positive electrode and the negative electrode are laminated through a sheet of separator, a battery element having a structure in which the positive electrode and the negative electrode are laminated through a sheet of strip-shaped separator that is folded in a zigzag shape, a battery element having a structure in which the positive electrode and the negative electrode are laminated through a pair of separators which are folded in a zigzag shape with the negative electrode interposed therebetween, and the like.

For example, the positive electrode includes a positive electrode current collector having a strip shape and the like, and a positive electrode active material layer formed on the positive electrode current collector. For example, the positive electrode active material layer is formed on both main surfaces of the positive electrode current collector. In addition, the positive electrode may have a region in which the positive electrode active material layer is formed only on a one-side main surface of the positive electrode current collector.

For example, the negative electrode includes a negative electrode current collector having a strip shape and the like, and a negative electrode active material layer that is formed on the negative electrode current collector. For example, the negative electrode active material layer is formed on both main surfaces of the negative electrode current collector. In addition, the negative electrode may have a region in which the negative electrode active material layer is formed only on a one-side main surface of the negative electrode current collector.

The lead 21a and the lead 21b are connected to the positive electrode current collector and the negative electrode current collector, respectively.

As materials of the positive electrode active material, the negative electrode active material, the electrolyte, and the separator, materials that have been suggested already may be used, and are selected in accordance with the type of the battery. Hereinafter, an example of materials of respective components in a case where the type of the battery is a lithium ion secondary battery that is a nonaqueous electrolyte battery will be described.

For example, the positive electrode current collector is constituted by metal foil such as aluminum foil. The positive electrode active material layer contains one or more kinds of positive electrode materials capable of intercalating and deintercalating lithium ions as a positive electrode active material. The positive electrode active material layer may contain other materials such as a binding agent and a conductive agent as necessary.

Appropriate examples of the positive electrode material, which is capable of intercalating and deintercalating lithium ions, include lithium-containing compounds such as lithium oxide, lithium phosphorous oxide, lithium sulfide, and an inter-layer compound containing lithium, and two or more kinds thereof may be mixed and used. So as to increase energy density, lithium-containing compounds including lithium, a transition metal element, and oxygen (O) are preferable. Examples of these lithium-containing compounds include lithium composite oxide having a layered rock salt-type structure, lithium composite phosphate having an olivine type structure, and the like. As the lithium-containing compounds, compounds containing at least one kind of element selected from the group including cobalt (Co), nickel (Ni), manganese (Mn), and iron (Fe) as a transition metal element are more preferable.

As the lithium-containing compounds, a lithium-containing compound expressed as $Li_xM1O_2$ or $Li_yM2PO_4$ may be used. In the formulae, M1 and M2 represent one or more kinds of transition metal elements. Values of x and y are different in accordance with a charging and discharging state of the battery, and typically satisfy relationships of $0.05 \leq x \leq 1.10$ and $0.05 \leq y \leq 1.10$. Examples of the composite oxide that contains lithium and a transition metal element include lithium cobalt composite oxide ($Li_xCoO_2$), lithium nickel composite oxide ($Li_xNiO_2$), lithium nickel cobalt composite oxide ($Li_xNi_{1-z}Co_zO_2$ ($0<z<1$)), lithium nickel cobalt manganese composite oxide ($Li_xNi_{(1-v-w)}Co_vMn_wO_2$ ($0<v+w<1$, $v>0$, $w>0$)), lithium manganese composite oxide ($LiMn_2O_4$) or lithium manganese nickel composite oxide ($LiMn_{2-t}Ni_tO_4$ ($0<t<2$)) which has a spinel-type structure, and the like. Among these, a composite oxide that contains cobalt is preferable. This is because high capacity is obtained and excellent cycle characteristics are also obtained. In addition, examples of a phosphate compound including lithium and a transition metal element include a lithium iron phosphate compound ($LiFePO_4$), a lithium iron manganese phosphate compound ($LiFe_{1-u}Mn_uPO_4$ ($0<u<1$)), and the like. Specific examples of the lithium composite oxide include lithium cobaltate ($LiCoO_2$), lithium nickelate ($LiNiO_2$), lithium manganate ($LiMn_2O_4$), and the like. In addition, a solid solution in which a part of the transition metal elements is substituted with a different element may be used. For example, nickel cobalt composite lithium oxide ($LiNi_{0.5}Co_{0.5}O_2$, $LiNi_{0.8}Co_{0.2}O_2$, and the like) may be exemplified.

Furthermore, from the viewpoints of obtaining relatively high electrode filling properties and cycle characteristics, composite particles, in which a surface of a core particle formed from any one of the above-described lithium-containing compounds is coated with fine particles formed from any one of other lithium-containing compounds, may be used.

In addition, examples of the positive electrode material capable of intercalating and deintercalating lithium ions include oxide, disulfide, chalcogenide, a conductive polymer, and the like. Examples of the oxide include vanadium oxide ($V_2O_5$), titanium dioxide ($TiO_2$), manganese dioxide ($MnO_2$), and the like. Examples of the disulfide include iron disulfide ($FeS_2$), titanium disulfide ($TiS_2$), molybdenum disulfide ($MoS_2$), and the like. As the chalcogenide, a layered compound or a spinel type compound is particularly preferable, and examples thereof include niobium selenide ($NbSe_2$) and the like. Examples of the conductive polymer include sulfur, polyaniline, polythiophene, polyacetylene, polypyrrole, and the like. The positive electrode material may be another material other than the above-described materials. In addition, two or more kinds of the above-described positive electrode materials may be mixed in an arbitrary combination.

In addition, as the conducting agent, for example, a carbon material such as carbon black and graphite is used. Examples of the binding agent include at least one kind selected from resin materials such as polyvinylidene fluoride (PVdF), polytetrafluoroethylene (PTFE), polyacrylonitrile (PAN), styrene butadiene rubber (SBR), and carboxymethyl cellulose (CMC), and copolymers containing these resin materials as a main component.

Negative Electrode

For example, the negative electrode current collector is constituted by metal foil such as copper foil.

The negative electrode active material layer contains any one or more kinds of negative electrode materials capable of intercalating and deintercalating lithium ions as the negative electrode active material, and may contain other materials, for example, the same conductive agent and the same binding agent as in the positive electrode active material layer as necessary.

In addition, in the nonaqueous electrolyte battery, an electrochemical equivalent of the negative electrode material capable of intercalating and deintercalating lithium ions is larger than that of the positive electrode, and is theoretically set in order for a lithium metal not to precipitate to the negative electrode during charging.

Examples of the negative electrode material capable of intercalating and deintercalating lithium ions include carbon materials such as a non-graphitization carbon, easy-graphitization carbon, graphite, pyrolytic carbons, cokes, glassy carbons, a fired substance of an organic polymer compound, carbon fiber, and activated charcoal. Among these, examples of the cokes include pitch coke, needle coke, petroleum coke, and the like. The fired substance of the organic polymer compound represents a carbonized substance that is obtained by firing polymer material such as a phenol resin or a furan resin at an appropriate temperature, and may be classified into non-graphitization carbon or easy-graphitization carbon in some parts. These carbon materials are preferable because a change in the crystal structure, which occurs during charging and discharging, is very small, a high charging and discharging capacity can be obtained, and satisfactory cycle characteristics can be obtained. Particularly, graphite is preferable because an electrochemical equivalent is large and a high energy density can be obtained. In addition, the non-graphitization carbon is preferable because excellent cycle characteristics are obtained. Furthermore, a material of which charge and discharge electric potential is low, specifically, a material of which charge and discharge electric potential is close to that of a lithium metal is preferable because high energy density of the battery can be easily realized.

Examples of the negative electrode material capable of intercalating and deintercalating lithium ions include a material which is capable of intercalating and deintercalating lithium ions and includes at least one kind of a metal element and a metalloid element as a constituent element. This is because a high energy density can be obtained when this material is used. Particularly, it is more preferable to use this material in combination with a carbon material because a high energy density and excellent cycle characteristics can be obtained. The negative electrode material may be an elementary substance of the metal element or the metalloid element, an alloy thereof, or a compound thereof, and the negative electrode material may have one or more kinds of phases thereof at least at a part. In addition, in the present disclosure, in addition to an alloy of two or more kinds of metal elements, the term "alloy" also includes an alloy containing one or more kinds of metal elements and one or more kinds of metalloid elements. In addition, the alloy may contain a nonmetal element. The texture of the alloy includes a solid solution, a eutectic crystal (a eutectic mixture), an intermetallic compound, and a texture in which two or more kinds of these textures coexist.

Examples of the metal elements or the metalloid elements, which constitute the negative electrode material, include a metal element or a metalloid element which is capable of forming an alloy with lithium. In addition, the negative electrode material that contains the element capable of forming an alloy with lithium is referred to as an alloy-based negative electrode material. Specific examples of the metal elements or the metalloid elements, which are capable of forming an alloy with lithium, include magnesium (Mg), boron (B), aluminum (Al), titanium (Ti), gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd), platinum (Pt), and the like. These may be crystalline materials or amorphous materials.

As the negative electrode material, for example, materials containing a metal element or a metalloid element of group 4B in a short-period type periodic table as a constituent element are preferable, materials containing at least one of silicon (Si) and tin (Sn) as a constituent element are more preferable, and materials containing at least silicon are still more preferable. This is because silicon (Si) and tin (Sn) have a large capacity for intercalating and deintercalating lithium ions and can obtain a high energy density. Examples of the negative electrode material, which contains at least one kind of silicon and tin, include elementary silicon, alloys or compounds of silicon, elementary tin, alloys or compounds of tin, and materials that have one or more kinds of phases thereof at least at a part.

Examples of alloys of silicon include alloys containing at least one kind selected from the group including tin (Sn), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr) as a secondary constituent element other than silicon. Examples of alloys of tin include alloys containing at least one kind selected from the group including silicon (Si), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr) as a secondary constituent element other than tin (Sn).

Examples of compounds of tin (Sn) or silicon (Si) include compounds containing oxygen (O) or carbon (C). Furthermore, the tin or silicon compounds may contain the above-described secondary constituent element in addition to tin (Sn) or silicon (Si).

Among these, as the negative electrode material, a SnCoC-containing material, which contains cobalt (Co), tin (Sn), and carbon (C) as a constituent element, and in which the amount of carbon is 9.9 mass % to 29.7 mass %, and a ratio of cobalt (Co) on the basis of the sum of tin (Sn) and cobalt (Co) is 30 mass % to 70 mass %, is preferable. This is because a high energy density and excellent cycle characteristics can be obtained in this compositional range.

The SnCoC-containing material may further contain another constituent element as necessary. As another constituent element, for example, silicon (Si), iron (Fe), nickel (Ni), chrome (Cr), indium (In), niobium (Nb), germanium (Ge), titanium (Ti), molybdenum (Mo), aluminum (Al), phosphorus (P), gallium (Ga), or bismuth (Bi) is preferable, and the SnCoC-containing material may contain two or more kinds of these constituent elements. This is because the capacity or cycle characteristics may be further improved.

In addition, the SnCoC-containing material has a phase including tin (Sn), cobalt (Co), and carbon (C), and it is preferable that this phase have a low crystalline or amorphous structure. In addition, in the SnCoC-containing material, it is preferable that at least a part of carbon (C) present as a constituent element be bonded to a metal element or a metalloid element present as another constituent element. The reason for the preference is as follows. A decrease in the cycle characteristics is considered to be due to aggregation or crystallization of tin (Sn) or the like, but when carbon (C) is bonded to another element, the aggregation or crystallization can be suppressed.

Examples of a measurement method of examining a bonding state of elements include X-ray photoelectron spectroscopy (XPS). In XPS, in the case of graphite, a peak of the 1s orbital (C1s) of carbon is shown at 284.5 eV in a device subjected to energy calibration in order for a peak of the 4f orbital (Au4f) of a gold atom to be obtained at 84.0 eV. In addition, in the case of surface-contaminated carbon, the peak is shown at 284.8 eV. On the other hand, in a case where a charge density of the carbon element increases, for example, in a case where carbon is bonded to a metal element or a metalloid element, the C1s peak is shown in a range below 284.5 eV. That is, in a case where a peak of a synthetic wave of C1s, which is obtained for the SnCoC-containing material, is shown at a range below 284.5 eV, at least a part of the carbon contained in the SnCoC-containing material enters a state of being bonded to the metal element or the metalloid element present as another constituent element.

In addition, in the XPS measurement, for example, the C1s peak is used for calibration of an energy axis of a spectrum. Typically, surface-contaminated carbon is present at the surface of the SnCoC-containing material, and thus the C1s peak of the surface-contaminated carbon is set to 284.8 eV, and this is used as an energy reference. In the XPS measurement, a waveform of the C1s peak is obtained as a waveform that includes both the peak of the surface-contaminated carbon and the peak of the carbon in the SnCoC-containing material. Therefore, the peak of the surface-contaminated carbon and the peak of the carbon in the SnCoC-containing material are separated from each other, for example, by an analysis conducted using commercially available software. In the waveform analysis, the position of a main peak present on a minimum binding energy side is used as the energy reference (284.8 eV).

Furthermore, examples of the negative electrode material, which is capable of intercalating and deintercalating lithium ions, further include metal oxides and polymer compounds which are capable of intercalating and deintercalating lithium ions. Examples of the metallic oxides include oxides such as lithium titanate ($Li_4Ti_5O_{12}$), iron oxide, ruthenium oxide, and molybdenum oxide. Examples of the polymer materials include polyacetylene, polyaniline, polypyrrole, and the like.

In addition, the negative electrode material capable of intercalating and deintercalating lithium ions may be materials other than the above-described materials. In addition, two or more kinds of the negative electrode materials may be mixed in an arbitrary combination.

For example, the negative electrode active material layer may be formed by any one of a gas phase method, a liquid phase method, a thermal spraying method, a firing method, and an application method, and two or more methods of these may be used in combination. In the case of forming the negative electrode active material layer by using the gas phase method, the liquid phase method, the thermal spraying method, the firing method, or two or more kinds of methods thereof, it is preferable that the negative electrode active material layer and the negative electrode current collector be alloyed at least at a part of an interface. Specifically, it is preferable that in the interface, a constituent element of the negative electrode current collector diffuse to the negative electrode active material layer, a constituent element of the negative electrode active material layer diffuse to the negative electrode current collector, or the constituent elements diffuse to each other. This is because fracture due to expansion and contraction of the negative electrode active material layer in accordance with charging and discharging can be suppressed, and electron conductivity between the negative electrode active material layer and the negative electrode current collector can be improved.

In addition, examples of the gas phase method include a physical deposition method and a chemical deposition method, specifically, a vacuum deposition method, a sputtering method, an ion plating method, a laser ablation method, a thermochemical vapor deposition (CVD; chemical vapor deposition) method, a plasma chemical vapor deposition method, and the like. As the liquid phase method, known methods such as electroplating, electroless plating, and the like may be used. For example, the firing method is a method in which a particle-shaped negative electrode active material is mixed with a binding agent and the like, the resultant mixture is dispersed in a solvent, the resultant dispersed solution is applied, and a heat treatment is performed at a temperature higher than the melting point of the binding agent and the like. With regard to the firing method, a known method can be used, and examples thereof include an atmosphere firing method, a reaction firing method, and a hot press firing method.

Separator

The separator is a component that isolates the positive electrode and the negative electrode from each other to prevent short-circuiting due to mutual contact of the electrodes, and allows lithium ions to pass therethrough. The separator is constituted by, for example, a porous membrane formed from a synthetic resin such as polytetrafluoroethylene, polypropylene, and polyethylene, or a porous membrane formed from ceramic, and may have a structure in which two or more kinds of the porous membranes are laminated.

Electrolyte

The electrolyte includes a polymer compound, and a nonaqueous electrolytic solution (electrolytic solution) that includes a solvent and an electrolyte salt. For example, the electrolyte includes a gel-shape electrolyte in which the nonaqueous electrolytic solution is retained by the polymer compound. For example, the polymer compound is impregnated with the electrolytic solution, and thus the polymer compound swells and forms a so-called gel shape. In the electrolyte, for example, the gel-shaped polymer compound itself, which absorbs and retains the electrolytic solution, functions as an ion conductor.

Nonaqueous Electrolytic Solution

The nonaqueous electrolytic solution includes an electrolyte salt and a nonaqueous solvent that dissolves the electrolyte salt.

Electrolyte Salt

For example, the electrolyte salt contains one or more kinds of light metal compounds such as a lithium salt. Examples of the lithium salt include lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate ($LiB(C_6H_5)_4$), lithium methanesulfonate ($LiCH_3SO_3$), lithium trifluoromethane sulfonate ($LiCF_3SO_3$), lithium tetrachloroaluminate ($LiAlCl_4$), dilithium hexafluorosilicate ($Li_2SiF_6$), lithium chloride (LiCl), lithium bromide (LiBr), and the like. Among these, at least one selected from the group including lithium hexafluorophosphate, lithium tetrafluoroborate, lithium perchlorate, and lithium hexafluoroarsenate is preferable, and lithium hexafluorophosphate is more preferable.

Examples of the nonaqueous solvent include lactone-based solvents such as γ-butyrolactone, γ-valerolactone, δ-valerolactone, and ε-caprolactone, carbonic acid ester-based solvents such as ethylene carbonate, propylene carbonate, butylene carbonate, vinylene carbonate, dimethyl carbonate, ethyl methyl carbonate, and diethyl carbonate, ether-based solvents such as 1,2-dimethoxyethane, 1-ethoxy-2-methoxyethane, 1,2-diethoxyethane, tetrahydrofuran, 2-methyltetrahydrofuran, nitrile-based solvents such as acetonitrile, sulfolane-based solvents, phosphoric acids, phosphoric acid ester solvents, and nonaqueous solvents such as pyrrolidones. Any one kind of the nonaqueous solvents may be used alone, or two or more kinds thereof may be mixed and used.

In addition, as the nonaqueous solvent, it is preferable to use a mixture obtained by mixing cyclic carbonic acid ester and chain carbonic acid ester. It is more preferable to include a compound in which a part or the entirety of hydrogen in cyclic carbonic acid ester and chain carbonic acid ester is fluorinated. As the fluorinated compound, it is preferable to use fluoroethylene carbonate (4-fluoro-1,3-dioxolane-2-one: FEC) or difluoro ethylene carbonate (4,5-difluoro-1,3-dioxolane-2-one: DFEC). Among these, it is preferable to use difluoro ethylene carbonate as the nonaqueous solvent. This is because an effect of improving cycle characteristics is excellent.

Polymer Compound

As the polymer compound that retains the nonaqueous electrolytic solution, a polymer that absorbs the nonaqueous electrolytic solution and gelates, and the like may be used. Examples of the polymer compound include fluorine-based polymer compounds such as a copolymer including polyvinylidene fluoride (PVdF) or vinylidene fluoride (VdF), and hexafluoropropylene (HFP) as a repetitive unit, ether-based polymer compounds such as a cross-linked body including polyethylene oxide (PEO), a polymer compound including polyacrylonitrile (PAN), polypropylene oxide (PPO), or polymethyl methacrylate (PMMA) as a repetitive unit, and the like. Any one kind of the polymer compounds may be used alone, or two or more kinds thereof may be mixed and used.

Particularly, the fluorine-based polymer compounds are preferable from the viewpoint of oxidation and reduction stability, and among these, a copolymer including vinylidene fluoride and hexafluoropropylene as a component is preferable. In addition, the copolymer may include monoester of unsaturated dibasic acid such as maleic acid monomethyl ester (MMM), halogenated ethylene such as trifluorochloroethylene (PCTFE), cyclic carbonic acid ester of an unsaturated compound such as vinylene carbonate (VC), epoxy group-containing acrylic vinyl monomer, or the like as a component. This is because even better characteristics may be obtained.

Exterior Material

For example, the exterior material 27 includes a laminated film in which a resin layer is formed on both surfaces of a metal layer. With regard to the laminated film, an outer resin layer is formed on a surface, which is exposed to the outside of the battery, in the metal layers, and an inner resin layer is formed on a battery inner surface that faces the battery element 20.

The metal layer plays an important role of blocking penetration of moisture, oxygen, and light to protect the content, and as the metal layer, aluminum (Al) is frequently used from the viewpoints of lightness, extensibility, price, and easy processing. The outer resin layer has beautiful external appearance, toughness, flexibility, and the like, and as the outer resin layer, a resin material such as nylon and polyethylene terephthalate (PET) is used. The inner resin layer is a portion which is melted with heat or ultrasonic waves and of which parts are fused to each other, and thus a polyolefin resin is preferable, and non-stretched polypropylene (CPP) is frequently used. An adhesive layer may be provided between the metal layer and the outer resin layer and between the metal layer and the inner resin layer as necessary.

The exterior material 27 is provided with a concave accommodation portion 26 which is formed from the inner resin layer side toward an outer resin layer direction, for example, by deep drawing and which accommodates the battery element 20, and the inner resin layer is arranged to face the battery element 20. Parts of the inner resin layer, which is opposite to the exterior material 27, come into close contact with each other at an outer peripheral portion of the accommodation portion 26 by fusion and the like. The adhesive films 24 and 25, which are configured to improve adhesiveness between the inner resin layer of the exterior material 27 and the leads 21a and 21b formed from a metal material, are disposed between the exterior material 27 and the leads 21a and 21b. The adhesive films 24 and 25 are formed from a resin material having high adhesiveness with the metal material, and are configured by a polyolefin resin such as polyethylene, polypropylene, and modified polyethylene or modified polypropylene thereof In addition, the exterior material 27 may be constituted by a laminated film having a different lamination structure, a polymer film such as polypropylene, or a metal film instead of the aluminum laminated film in which the metal layer is formed from aluminum (Al).

Substrate Section

The substrate section 13 is provided to perform control of an operation of the battery pack, and the like. For example, the substrate section 13 is a member that includes a rigid substrate 13a and a flexible substrate 13b that is bonded to the rigid substrate 13a, and the like. A protection circuit (PCM: Protection Circuit Module) is formed in the substrate section 13. For example, the substrate section 13 includes a control unit, a temperature detection unit, a positive temperature coefficient (PTC), a connector for connection with the outside, and the like.

The control unit controls the overall operation of the battery pack, and includes, for example, a central processing unit (CPU), a memory, and the like. The control unit monitors the voltage of the battery cell 11, and in a case where the voltage exceeds a predetermined voltage (for example, 4.3 V to 4.4 V, and the like), turns off a charging and discharging control FET so as to prohibit charging. In addition, in a case where the terminal voltage of the battery cell 11 is overdischarged to less than a discharging prohibition voltage and thus the terminal voltage of the battery cell 11 becomes less than the discharging prohibition voltage, the control unit turns off the charging and discharging control FET to prohibit discharging.

The temperature detection unit measures a temperature of the battery cell 11 and outputs a measurement result to the control unit, and includes, for example, a temperature detection element such as a thermistor. In addition, the measurement result obtained by the temperature detection unit is used in a case where the control unit performs charging and discharging control at the time of abnormal heat generation, in a case where the control unit performs a correction process at the time of calculating remaining capacity, and the like.

In a case where the battery cell 11 reaches a high temperature, the PTC cuts off a current circuit of the battery cell 11 to prevent overheating of the battery cell 11. The PTC is connected to the battery cell 11 in series. In a case where a temperature of the battery cell 11 becomes higher than a temperature that is set, electrical resistance rapidly increases, and thus the PTC substantially cuts off a current that flows to the battery cell 11.

Resin Section

The resin section 12 comes into close contact with a close contact portion that includes at least a part of the battery cell 11, or a close contact portion that includes at least a part of the battery cell 11 and at least a part of the substrate section 13. The resin section 12 is a cured member of a curable resin composition sheet 12', and includes a cured material of the curable resin composition sheet 12'.

Curable Resin Composition Sheet

As the curable resin composition sheet 12', a thermosetting resin composition sheet is used. The thermosetting resin composition sheet may be shape-processed. In addition, the thermosetting resin composition sheet represents a member that is obtained by molding a thermosetting resin composition into a sheet shape. The sheet shape represents, for example, a planar shape that is very thin in comparison to the length and the width thereof. Typically, a shape having a thickness of 0.2 mm or more is referred to as a sheet shape, and a shape having a thickness of less than 0.2 mm is referred to as a film shape. However, in this specification, both of the shapes are collectively referred to as the sheet shape. The thermosetting resin composition sheet that is shape-processed represents a member obtained by processing the thermosetting resin composition sheet into a desired shape by subjecting the thermosetting resin composition sheet to, for example, processing such as folding and cutting. In the case of using the thermosetting resin composition sheet that is shape-processed, it is preferable that the thermosetting resin composition sheet be processed into a shape conforming to the shape of the close contact portion so as to improve adhesiveness with respect to the close contact portion after curing.

The curable resin composition sheet 12a' and the curable resin composition sheet 12b' which are separate from each other adhere to the close contact portion of the battery cell 11, and then curing is performed to form the resin section 12a and the resin section 12b which are separate from each other.

The curable resin composition sheet 12b' adheres to one side end surface 22b1, the other side end surface 22b2, and a lower end surface 22c of the battery cell 11 which constitute the close contact portion. The curable resin composition sheet 12b' is a member that is processed into a shape conforming to the shapes of the one side end surface 22b1, the other side end surface 22b2, and the lower end surface 22c of the battery cell 11 which constitute the close contact portion.

For example, the curable resin composition sheet 12b' is processed as follows. A curable resin composition sheet processed into a strip shape is bent approximately perpendicularly at two sites to have an approximately U-shaped planar shape, and surface shapes with respect to the respective end surfaces of the one side end surface 22b1, the other side end surface 22b2, and the lower end surface 22c are processed to conform to shapes of the respective opposite end surfaces.

The curable resin composition sheet 12a' adheres to a part (a portion other than a portion mounted on a terrace portion 22a) of the rigid substrate 13a and a part of the terrace portion 22a at the periphery of the rigid substrate 13a which constitute the close contact portion. In addition, the terrace portion 22a is a bonding portion of the exterior material 27 (which includes a portion at which the leads 21a and 21b are interposed between parts of the exterior material 27) along one side on a side at which the leads 21a and 21b are provided.

The curable resin composition sheet 12a' is processed into a shape conforming to the close contact portion. For example, the curable resin composition sheet 12a' is a member obtained by processing the curable resin composition sheet into a box shape having an opening in one surface. The rigid substrate 13a is put into an inner space of the curable resin composition sheet 12a' processed into a box shape from the opening formed in the one surface, and the curable resin composition sheet 12a' adheres to a portion of the rigid substrate 13a other than a portion mounted on the terrace portion 22a, and a part of the terrace portion 22a.

Thermosetting Resin Composition

As the thermosetting resin composition that is used for the thermosetting resin composition sheet, a thermosetting resin composition that has been suggested already may be used. Typically, as the thermosetting resin composition, for example, thermosetting resin compositions that contain an epoxy resin, and the like may be used. The thermosetting resin composition may contain at least any one of an organic filler, an inorganic filler, a curing agent, and the like in addition to a resin component.

The thermosetting resin composition sheet may contain a fibrous material such as glass fiber. In this case, it is possible to suppress occurrence of partial unevenness due to surface tension when the thermosetting resin composition is cured, and thus this case is preferable. In addition, it is possible to suppress occurrence of sagging in a resin due to gravity when the thermosetting resin composition is softened, and thus this case is also preferable.

It is preferable that the thermosetting resin composition sheet have the following characteristics. Specifically, the thermosetting resin composition sheet has, for example, tackiness. In the case of being heated, the thermosetting resin composition sheet is melted at an initial heating stage and shows a behavior close to that of a liquid phase, and is cured at a temperature equal to or higher than a curing temperature and the shape is retained. This is because at the initial heating stage, flowability is improved and thus adhesiveness with respect to a close contact surface can be improved, and after being cured, stable hardness can be maintained in a shape that comes into contact with the close contact surface. In addition, it is easy for a person having ordinary skill in the art to obtain the thermosetting resin composition sheet having such characteristics. That is, a person having ordinary skill in the art can obtain the thermosetting resin composition sheet having the above-described characteristics by appropriately preparing a composition sheet of the thermosetting resin composition. In addition, a commercially available thermosetting resin composition sheet having such characteristics may be used.

Preferred Embodiment of Resin Section

Figure 4A:
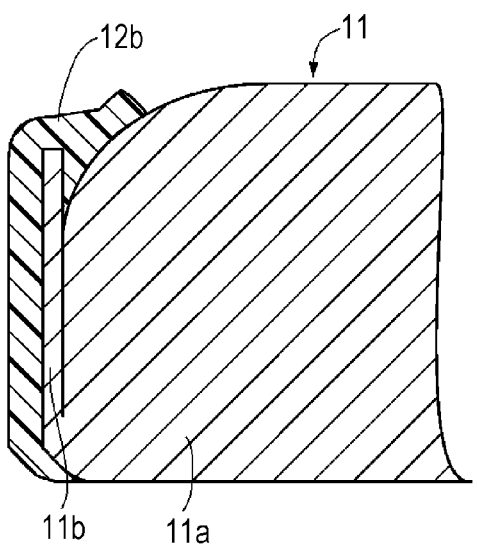
FIG. 4A is a partial cross-sectional view of the battery pack.
Figure 4B:
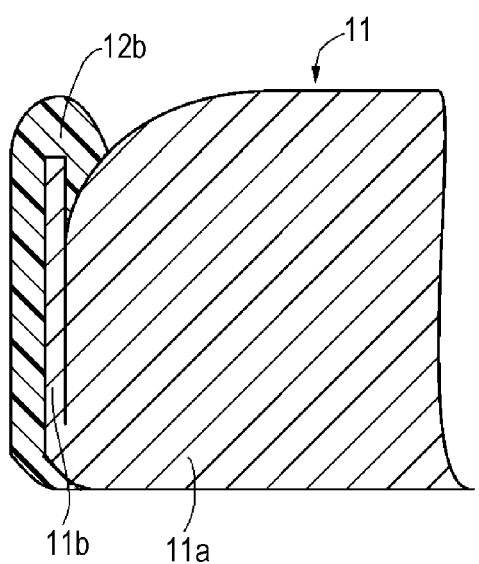
FIG. 4B is a partial cross-sectional view of the battery pack.

FIGS. 4A and 4B are partial cross-sectional views illustrating a part of the resin section which comes into close contact with one side end surface of the battery cell. As illustrated in FIGS. 4A and 4B, the battery cell 11 includes a cell main body 11a including the battery element and a part of the exterior material that covers the battery element, and a fusion portion 11b obtained by fusing parts of the exterior material, which face each other, to each other. The fusion portion 11b is folded back, and at least a part thereof comes into close contact with a part of the cell main body 11a.

Figure 5:
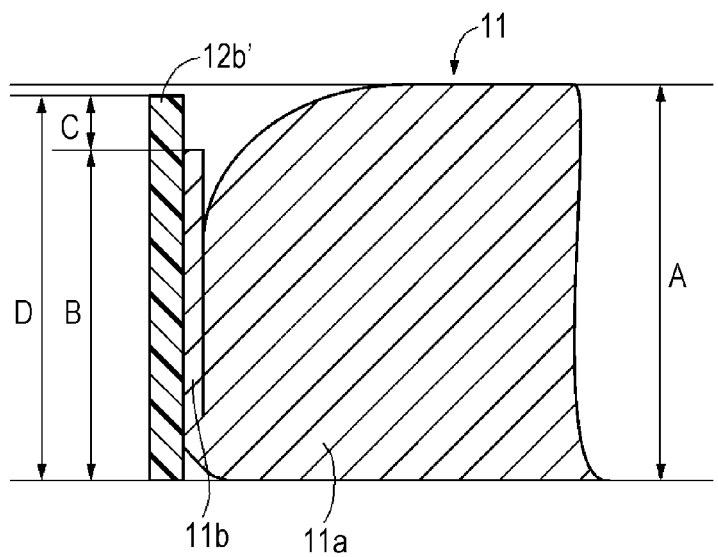
FIG. 5 is a partial cross-sectional view of the battery pack.

It is preferable that the resin section 12b include a surplus portion that, when initially formed, does not come into close contact with the fusion portion 11b that is folded back (as shown in FIG. 5), and then the surplus portion is further formed to come into close contact with the fusion portion 11b, which is folded back, to a part of the cell main body 11a (as shown in FIG. 4A or 4B). This is because it is possible to more reliably fix the fusion portion 11b that is folded back, and it is possible to further improve the strength of the battery pack. In addition, it is preferable that the resin section 12b be formed not to exceed the highest position of the cell main body 11a in a thickness direction. This is because it is possible to further improve a volume energy density.

Height of Curable Resin Composition Sheet

FIG. 5 is a partial cross-sectional view illustrating a part of the curable resin composition sheet that adheres to one side end surface of the battery cell. FIG. 5 illustrates a part of the curable resin composition sheet that has the shape of the resin section before curing. In the curable resin composition sheet 12b', the height of an adhesion portion, which adheres to the one side end surface 22b1, the other side end surface 22b2, and the lower end surface 22c which connect two opposite main surfaces of the battery cell 11, along a thickness direction of the battery cell 11 is preferably defined as follows.

Specifically, it is preferable that the thickness (A) of the cell main body and the height (D) of the curable resin composition sheet satisfy the relationship of A≥D. In this case, the resin section 12b, which is formed when the curable resin composition sheet 12b' is cured, is allowed not to exceed the highest position of the cell main body 11a in the thickness direction, and as a result, it is possible to further improve the volume energy density.

In addition, it is preferable that the height (D) of the curable resin composition sheet and the height (B) of the fusion portion that is folded back satisfy the relationship of D>B. According to this, at least a part of the surplus portion, which corresponds to a length C (C>0), of the curable resin composition sheet 12b' comes into close contact with a part of the cell main body 11a after curing. In addition, the height (B) of the fusion portion 11b that is folded back represents the length up to the highest position of the fusion portion 11b that is folded back on the basis of the lowest position of the cell main body 11a.

In the battery cell 11 that satisfies the relationship of D>B, at least a part of the resin section 12b comes into close contact with from the fusion portion 11b, which is folded back, to a part of the cell main body 11a. As a result, it is possible to more reliably fix the fusion portion 11b that is folded back, and it is possible to further improve the strength of the battery pack.

It is preferable that the thickness (A) of the cell main body, the height (D) of the curable resin composition sheet, and the height (B) of the fusion portion that is folded back satisfy the relationships of A≥D and D>B. According to this, it is possible to allow at least a part of the resin section 12b to come into close contact with from the fusion portion 11b, which is folded back, to a part of the cell main body 11a, and it is possible to allow the resin section 12b not to exceed the highest position of the cell main body 11a in the thickness direction. As a result, it is possible to more reliably fix the fusion portion 11b that is folded back, it is possible to further improve the strength of the battery pack, and it is possible to further improve the volume energy density.

Method of Manufacturing Battery Pack

A method of manufacturing the battery pack according to the first embodiment of the present disclosure will now be described.

Process of Preparing Battery Element

First, for example, a positive electrode and a negative electrode in which an electrolyte is formed on both surfaces thereof, respectively, and a separator are sequentially laminated in the order of the negative electrode, the separator, the positive electrode, and the separator. Then, the laminated body is wound around a flat plate core, and then the resultant body is wound a plurality of times in a longitudinal direction to prepare the wound-type battery element 20.

Process of Preparing Battery Cell

The battery element 20 is accommodated in the accommodation portion 26 provided for the exterior material 27, and the exterior material 27 is folded back to cover the opening of the accommodation portion 26. Then, three sides except a side that is folded back are sealed by thermal fusion and the like to prepare the battery cell 11. At this time, the adhesive films 24 and 25 are interposed between the lead 21a and the exterior material 27 and between the lead 21b and the exterior material 27, respectively.

Process of Connecting Lead and the Like

The leads 21a and 21b of the battery cell 11 are connected to the substrate section 13, for example, by thermal welding, ultrasonic welding, and the like.

Process of Shape-Processing Curable Resin Composition Sheet

Next, as illustrated in FIG. 1, the curable resin composition sheet is processed into a shape conforming to the close contact portion so as to match the close contact portion. According to this, the curable resin composition sheet 12a' and the curable resin composition sheet 12b', which are shape-processed, are obtained. For example, the curable resin composition sheet is processed into a box shape having an opening in one surface, thereby obtaining the curable resin composition sheet 12a'. The curable resin composition sheet is processed into a strip shape, is bent to have an approximate U shape, and is processed into a shape conforming to the shape of the close contact portion including the one side end surface 22b1, the other side end surface 22b2, and the lower end surface 22c of the battery cell 11, thereby obtaining the curable resin composition sheet 12b'.

Process of Forming Resin Section

Next, the rigid substrate 13a of the substrate section 13 is disposed on the terrace portion 22a of the battery cell 11, and the curable resin composition sheet 12a', which is processed into the box shape having the opening in one surface, adheres to a part of the rigid substrate 13a and a part of the terrace portion 22a at the periphery of the rigid substrate 13a, which constitute a close contact portion, as temporary adhesion. Similarly, the curable resin composition sheet 12b', which is processed into an approximate U shape, adheres to the one side end surface 22b1, the other side end surface 22b2, and the lower end surface 22c of the battery cell 11 which constitute a close contact portion as temporary adhesion.

Next, the curable resin composition sheets 12a' and 12b' are heated to a temperature higher than a curing temperature. According to this, the curable resin composition sheets 12a' and 12b', which are formed from the thermosetting resin composition, are melted at an initial heating stage, and flowability is improved, and thus adhesiveness with respect to the close contact surface increases. Then, the curable resin composition sheets 12a' and 12b' are cured at a temperature equal to or higher than the curing temperature, thereby obtaining the resin sections 12a and 12b. According to this, the battery pack according to the first embodiment of the present disclosure is obtained.

In addition, Shore hardness and Vickers hardness of the resin sections 12a and 12b can be adjusted by adjusting at least any one of a heating temperature and a heating time. According to the hardness adjustment, the resin section 12 after curing can have a state corresponding to hardness according to usage. For example, the resin section 12 after curing can be allowed to have a shape having cushioning characteristics without hardness. It is possible to design the resin section 12 by selecting a flexible state or a state corresponding to the hardness according to the specifications.

Effect of Battery Pack

Hereinafter, an effect of the battery pack according to this embodiment of the present disclosure will be described by comparison with a typical battery pack.

Typical Battery Pack

Figure 6:
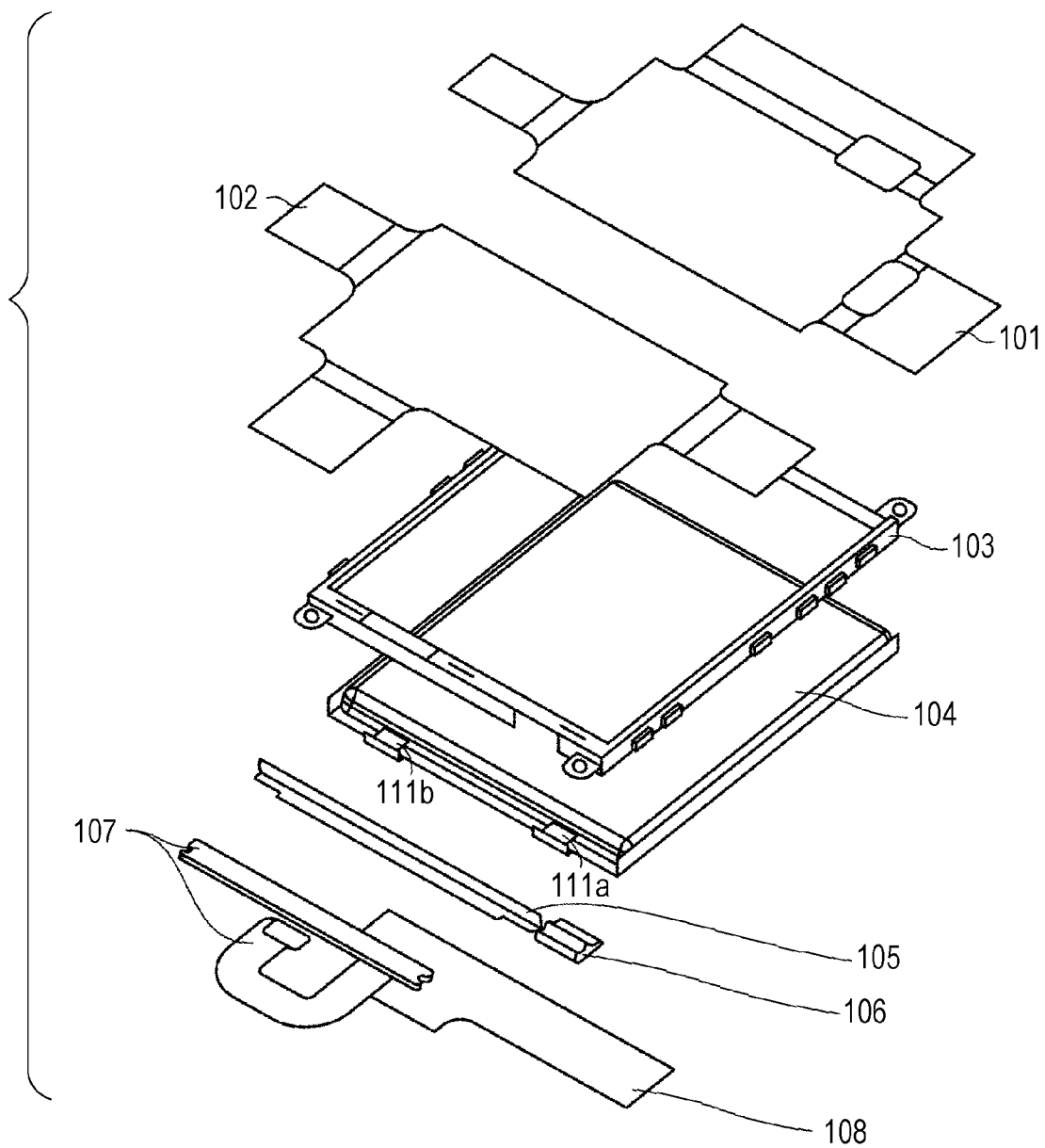
FIG. 6 is an exploded perspective view illustrating a configuration example of a typical battery pack.

FIG. 6 is an exploded perspective view of a typical battery pack to which a frame is applied as an accommodation member of a battery cell. First, a configuration of the battery pack will be briefly described. As illustrated in FIG. 6, the battery pack includes a label 101, a top tape 102, a frame 103, a battery cell 104, an insulating plate 105, a PI (polyimide) tape 106, a substrate section 107 in which a protective circuit (PCM) is formed, and an insulating tape 108.

The battery cell 104 is fitted into the frame 103 having a rectangular frame shape. The top tape 102 and the label 101 adhere to the top surface of the battery cell 104 which is exposed from the frame 103, and the frame 103, and thus the battery cell 104 is fixed to the frame 103.

The insulating plate 105 and the substrate section 107 are disposed at a terrace portion on a top side of the battery cell 104. The insulating plate 105 is fixed to the terrace portion of the battery cell 104 by the PI tape 106, and the substrate section 107 is fixed to the terrace portion of the battery cell 104 by the insulating tape 108. Leads 111a and 111b, which are led out from the battery cell 104, are connected to the substrate section 107.

Figure 7A:
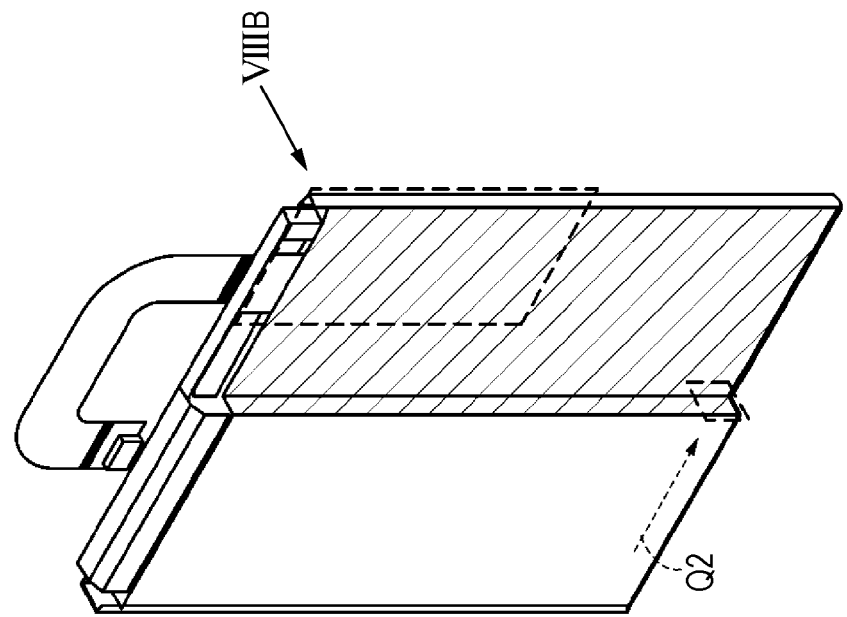
FIG. 7A is a perspective view in which a part of the typical battery pack is omitted.
Figure 7B:
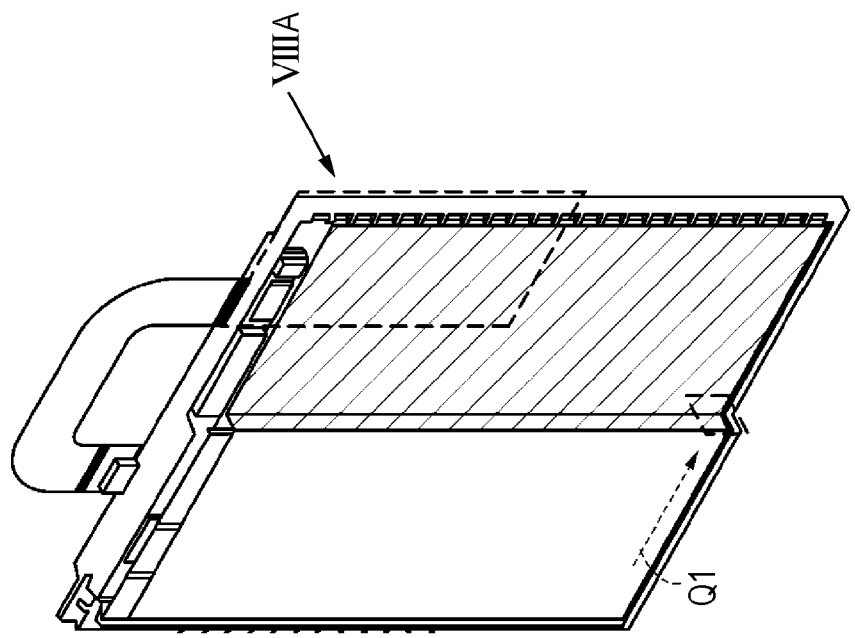
FIG. 7B is a perspective view in which a part of the battery pack according to the first embodiment of the present disclosure is omitted.

Comparison between Battery Pack According to Embodiment of Present Disclosure and Typical Battery Pack FIG. 7A is a perspective view of the battery pack to which the frame is applied as the accommodation member of the battery cell. FIG. 7B is a perspective view of the battery pack to which the thermosetting resin composition sheet according to this embodiment of the present disclosure is applied. However, in FIGS. 7A and 7B, a part of the battery pack is omitted. In FIGS. 7A and 7B, a cut-out surface of an omitted portion of the battery cell is indicated by diagonal lines. In addition, comparison is performed on the assumption that external dimensions of the two battery packs are set to be the same as each other.

Figure 8A:
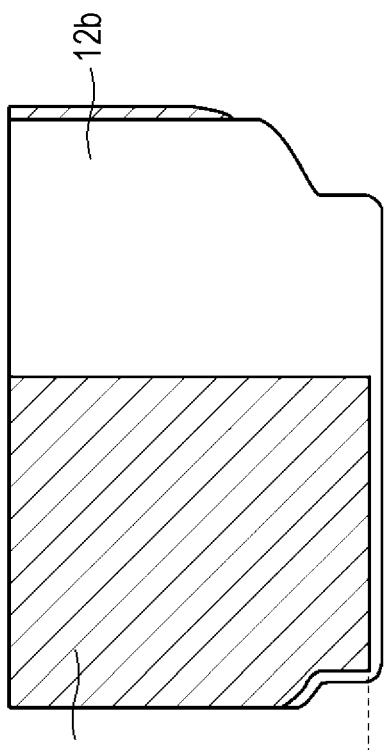
FIG. 8A is a schematic cross-sectional view illustrating a region surrounded by dotted lines when viewed from a direction of an arrow VIIIA in FIG. 7A.
Figure 8B:
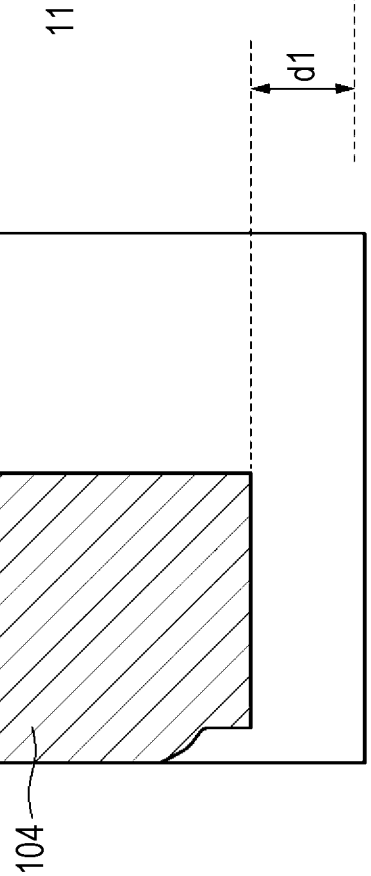
FIG. 8B is a schematic cross-sectional view illustrating a region surrounded by dotted lines when viewed from a direction of an arrow VIIIB in FIG. 7B.

FIG. 8A is a cross-sectional view illustrating a region surrounded by dotted lines when viewed from a direction indicated by an arrow VIIIA in the battery pack shown in FIG. 7A. FIG. 8B is a cross-sectional view illustrating a region surrounded by dotted lines when viewed from a direction indicated by an arrow VIIIB. FIG. 9A is a cross-sectional view illustrating a region surrounded by dotted lines when viewed from a direction indicated by an arrow Q1. FIG. 9B is a cross-sectional view illustrating a region surrounded dotted lines when viewed from a direction indicated by an arrow Q2.

According to the comparison illustrated in FIGS. 8A and 8B, in the battery pack illustrated in FIG. 8B according to the embodiment of the present disclosure, it can be seen that it is possible to increase a portion (battery cell portion), which contributes to battery capacity, on a lower end surface side by a thickness d1 in comparison to the typical battery pack illustrated in FIG. 8A. According to the comparison illustrated in FIGS. 9A and 9B, in the battery pack illustrated in FIG. 9B according to the embodiment of the present disclosure, it can be seen that it is possible to increase a portion (battery cell portion), which contributes to battery capacity, by a thickness d2 in comparison to the typical battery pack illustrated in FIG. 9A. In addition, in the battery pack to which a frame is applied, a clearance is apt to occur between the battery cell 104 and the frame 103. However, in the battery pack to which the thermosetting resin composition sheet according to the embodiment of the present disclosure is applied, the resin section 12b comes into close contact with the battery cell 11, and thus it is possible to avoid capacity loss corresponding to the clearance. As described above, in the battery pack according to the embodiment of the present disclosure, it can be seen that it is possible to improve the energy density per volume.

Comparison between Battery Pack According to Embodiment of Present Disclosure and Battery Pack Using Tape FIG. 10 is an exploded perspective view of a battery pack using tape. First, a configuration of the battery pack will be briefly described. As illustrated in FIG. 10, the battery pack includes a protective tape 201, a battery cell 202, an insulating tape 203, a holder 204, a substrate section 205 in which a protective circuit (PCM) is formed, and a PI tape 206.

The protective tape 201 is a tape material such as a polyimide tape that is processed into a frame shape having a rectangular contour portion. The protective tape 201 adheres to the battery cell 202 in such a manner that a part of the battery cell 202 is exposed from the contour portion, and one side end surface, the other side end surface, a lower end surface, and a terrace portion of the battery cell 202 are covered with the frame portion. The insulating tape 203, the substrate section 205, and the holder 204 that covers the substrate section 205 are disposed at the terrace portion on a top side of the battery cell 202. The insulating tape 203, the substrate section 205, and the holder 204 that covers the substrate section 205 are fixed by the protective tape 201 and the PI tape 206. Leads 211a and 211b, which are led out from the battery cell 202, are connected to the substrate section 205.

Figure 11A:
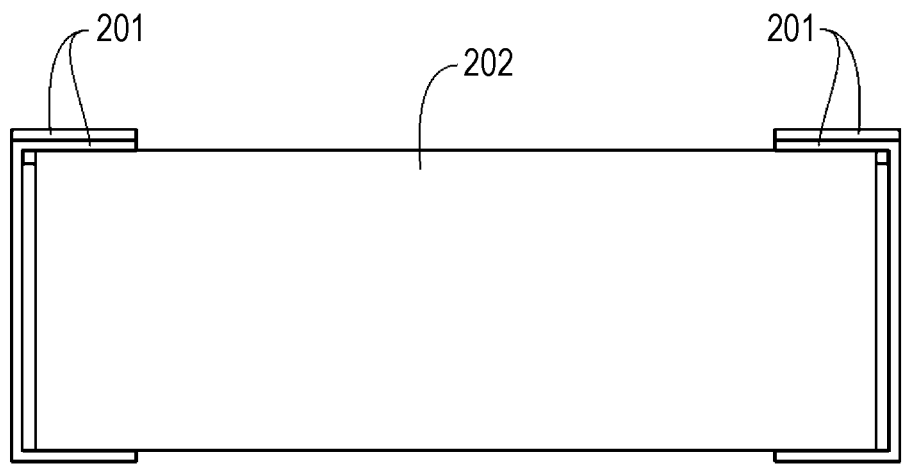
FIG. 11A is a cross-sectional view of the battery pack using the tape.
Figure 11B:
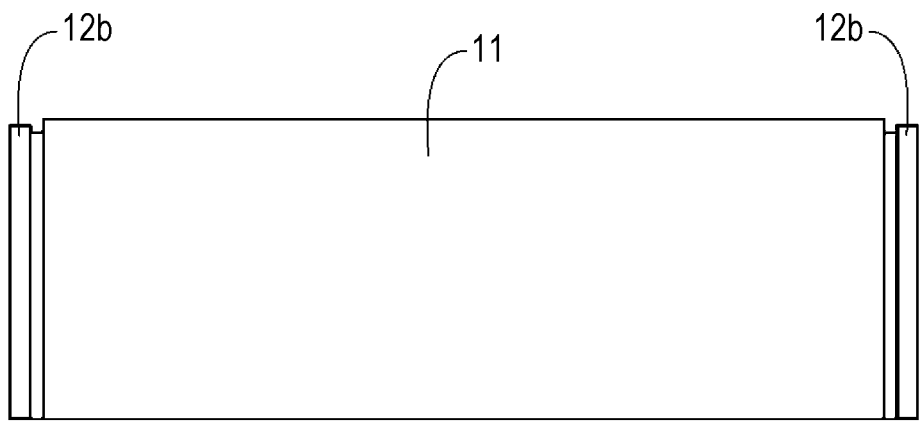
FIG. 11B is a cross-sectional view of a battery pack to which a thermosetting resin composition sheet of the present disclosure is applied.

FIG. 11A is a cross-sectional view of the battery pack using tape. FIG. 11B is a cross-sectional view of the battery pack to which the thermosetting resin composition sheet according to the embodiment of the present disclosure is applied. In addition, comparison is performed on the assumption that external dimensions of the two battery packs are set to be the same as each other.

In the battery pack illustrated in FIG. 11A, a total of three sheets of protective tapes 201 overlap each other in a thickness direction of the battery cell 202. In contrast, in the battery pack according to the embodiment of the present disclosure as illustrated in FIG. 11B, the resin section 12b, that overlaps the battery cell 202 in a thickness direction thereof, can be omitted or reduced. According to this, in the battery pack according to the embodiment of the present disclosure as illustrated in FIG. 11B, it is possible to reduce the thickness by a thickness corresponding to three sheets of tape in comparison to the battery pack illustrated in FIG. 11A, and thus it can be seen that it is possible to increase a portion contributing to the battery capacity by the reduced thickness.

Modification Example 1

Figure 12:
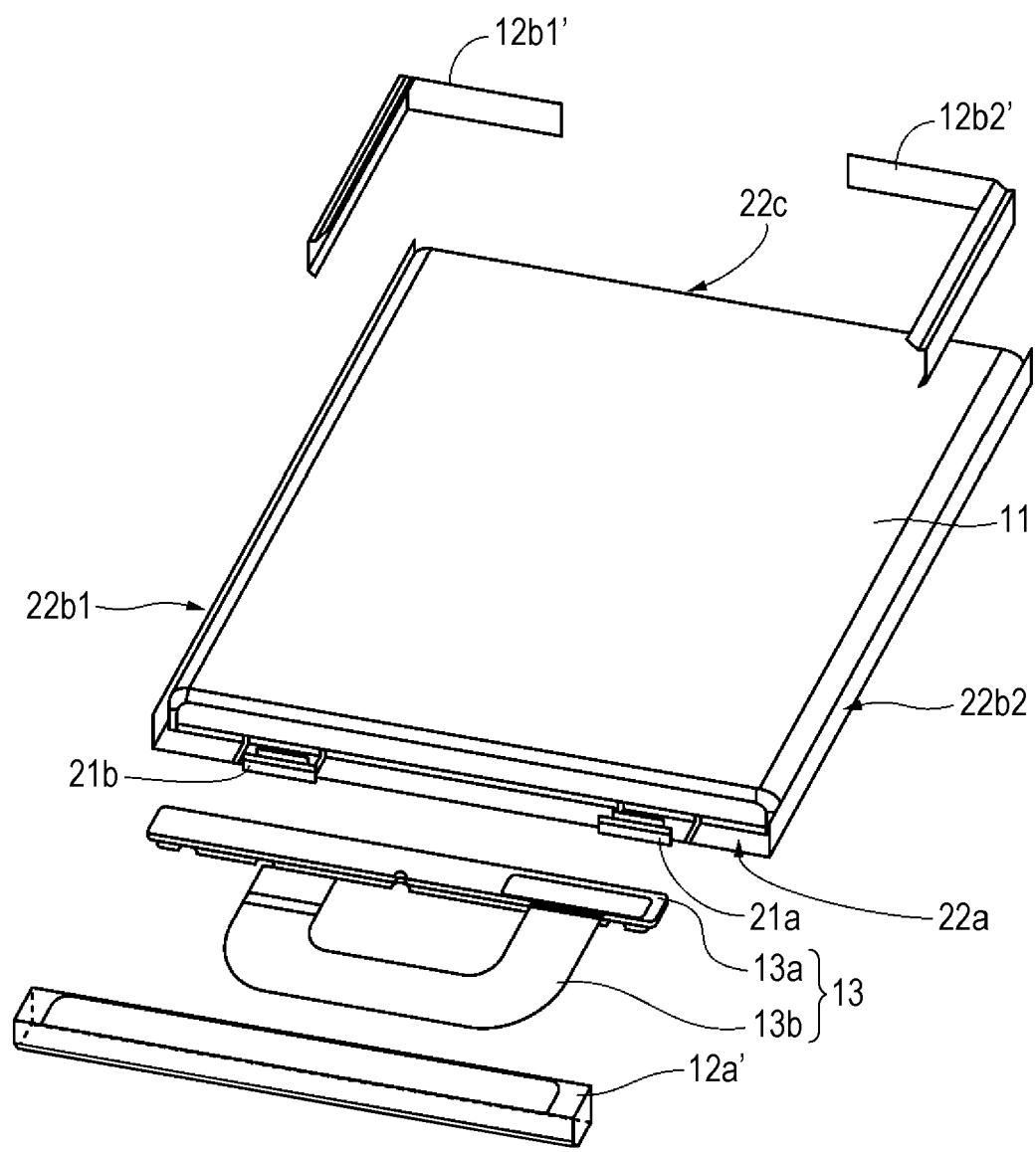
FIG. 12 is an exploded perspective view illustrating a configuration example of a modification example of the battery pack.

The battery pack according to the first embodiment of the present disclosure may have the configuration illustrated in FIG. 12. The battery pack is the same as that illustrated in FIG. 1 except that two curable resin composition sheets 12b1' and 12b2', which are separate from each other, are used instead of the curable resin composition sheet 12b' which comes into close contact with the one side end surface 22b1, the other side end surface 22b2, and the lower end surface 22c. As illustrated in FIG. 12, the two curable resin composition sheets 12b1' and 12b2', which are separate from each other, adhere to two corners on both side-end sides of the lower end surface 22c of the battery cell 11, respectively. Then, the curable resin composition sheet 12b1' is heated, and thus a resin section that is a cured material of the curable resin composition sheet 12b1' is formed. The resin section comes into close contact with one of the two corners on both side-end sides of the lower end surface 22c that is a close contact portion. Similarly, the curable resin composition sheet 12b2' is heated, and thus a resin section that is a cured material of the curable resin composition sheet 12b2' is formed. The resin section comes into close contact with the other of the two corners on both side-end sides of the lower end surface 22c that is a close contact portion.

The curable resin composition sheet 12b1' is obtained by processing the thermosetting resin composition sheet into a shape conforming to one corner of the battery cell 11 which is a close contact portion. For example, the curable resin composition sheet 12b1' is processed as follows. A thermosetting resin composition sheet processed into a strip shape is bent to have an L shape, and the resultant thermosetting resin composition sheet is processed into a shape conforming to one corner of the battery cell 11 which is a close contact portion.

The curable resin composition sheet 12b2' is obtained by processing the thermosetting resin composition sheet into a shape conforming to the other corner of the battery cell 11 which is a close contact portion. For example, the curable resin composition sheet 12b1' is processed as follows. A thermosetting resin composition sheet processed into a strip shape is bent to have an L shape, and the resultant thermosetting resin composition sheet is processed into a shape conforming to another corner of the battery cell 11 which is a close contact portion.

Modification Example 2

The battery pack according to the first embodiment of the present disclosure may use a laminated sheet as the curable resin composition sheet 12'. The laminated sheet has a lamination structure including another layer that is laminated together with the thermosetting resin composition sheet. For example, the laminated sheet includes at least a curable resin composition layer, and has a lamination structure including the curable resin composition layer constituted by one or more curable resin composition sheets and one or more different layers. The laminated sheet adheres to a close contact portion in such a manner that the curable resin composition layer faces the close contact portion.

In the case of using the laminated sheet, it is possible to suppress the occurrence of partial unevenness due to surface tension during curing and the occurrence of sagging in a resin due to gravity when the resin is softened. Examples of the different layers include a fiber-shaped sheet including a fibrous material such as glass fiber. In addition, as the different layers, a resin layer such as polyimide, and the like may be used. In this case, the curable resin composition layer has adhesiveness, and thus contamination such as a finger print tends to occur. However, when the resin layer such as polyimide is disposed at the outermost layer, the resin layer functions as a protective layer that protects the curable resin composition layer, and thus it is possible to solve a problem on external appearance such as easy occurrence of contamination, and thus this disposition is preferable.

Examples of the laminated sheet including at least the curable resin composition layer include a laminated sheet having a three-layer lamination structure in which the curable resin composition layer, the fiber-shaped sheet layer, and the curable resin composition layer are sequentially laminated in this order, a laminated sheet having a two-layer lamination structure in which the curable resin composition layer and the polyimide (resin layer) are sequentially laminated in this order, and the like. In addition, the lamination structure is not limited to the above-described structure.

Modification Example 3

The battery pack according to the first embodiment of the present disclosure may include a curved battery cell. The battery pack can be disposed in an electronic apparatus such as a wearable terminal, which can be attached to a user, along a curved surface of the electronic apparatus, and thus the battery pack is appropriately used as a power supply of the electronic apparatus.

Figure 13A:
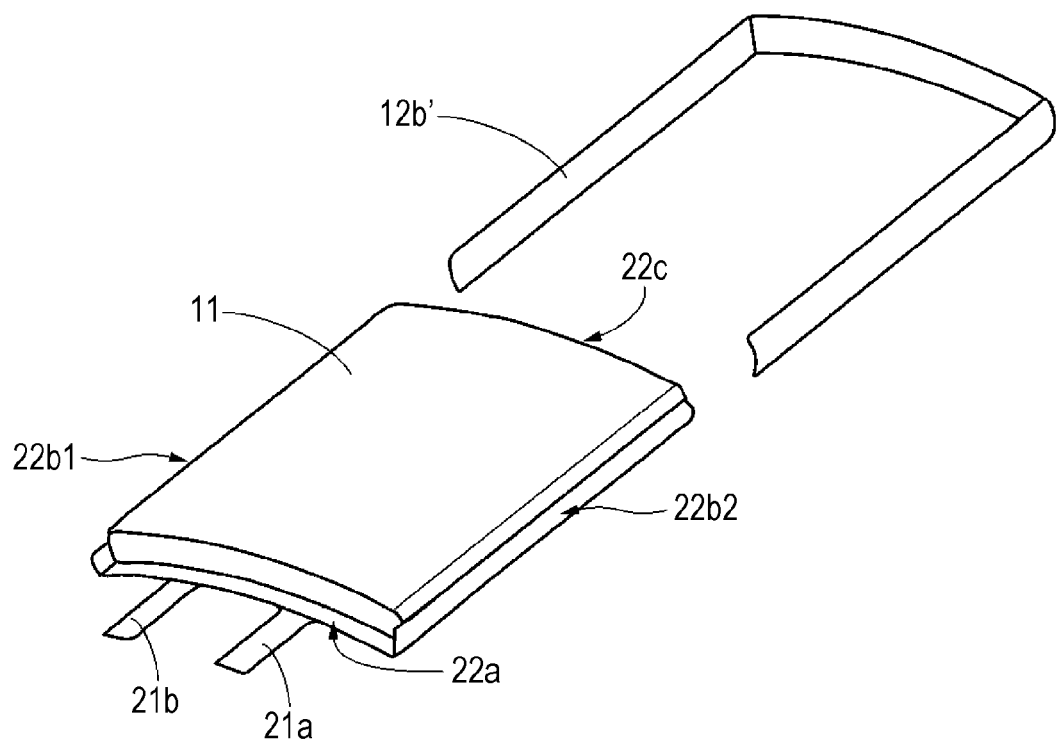
FIG. 13A is an exploded perspective view illustrating a configuration example of a battery pack of Modification Example 3.
Figure 13B:
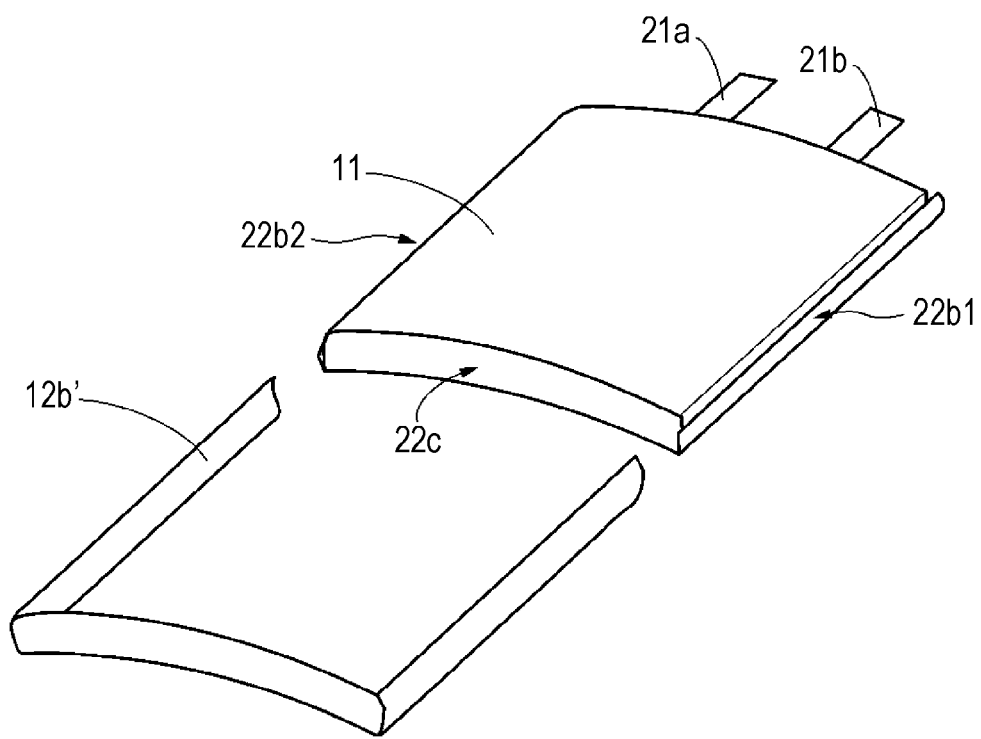
FIG. 13B is an exploded perspective view illustrating the configuration example of the battery pack of Modification Example 3.
Figure 14A:
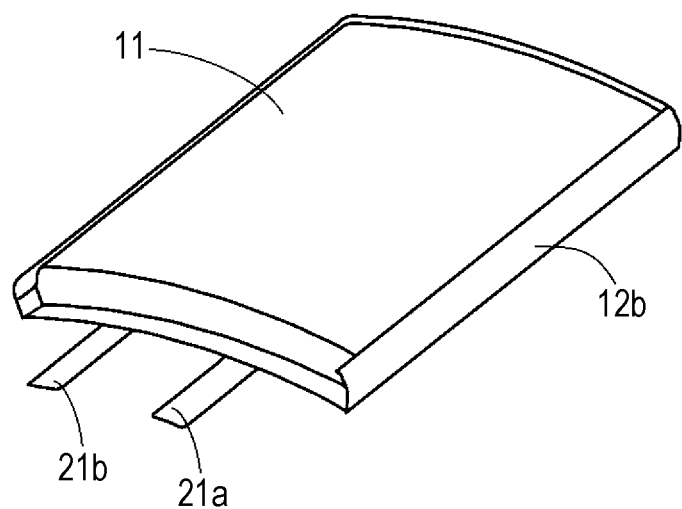
FIG. 14A is a perspective view illustrating the external appearance of the battery pack of Modification Example 3.
Figure 14B:
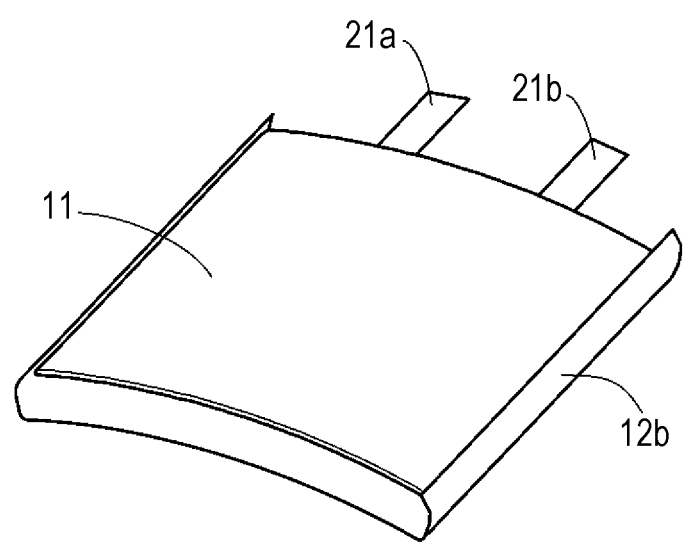
FIG. 14B is a perspective view illustrating the external appearance of the battery pack of Modification Example 3.

FIGS. 13A and 13B are exploded perspective views illustrating a configuration example of a battery pack according to Modification Example 3. FIGS. 14A and 14B are perspective views illustrating the external appearance of the battery pack of Modification Example 3. In addition, in FIGS. 13A and 13B, a curable resin composition sheet, which has a state before curing of the resin section illustrated in FIGS. 14A and 14B, is illustrated.

The battery pack of Modification Example 3 is the same as the battery pack illustrated in FIGS. 1 and 2 except that the shape of the battery cell is different. That is, as illustrated in FIGS. 13A, 13B, 14A, and 14B, the battery pack includes a curved battery cell 11, and a resin section 12b that comes into close contact with at least a part of the battery cell 11. In addition, although not illustrated, as is the case with the battery pack illustrated in FIGS. 1 and 2, the battery pack includes a substrate section 13 that is connected to leads 21a and 21b, and a resin section 12a that comes into close contact with a close contact portion including at least a part of the battery cell 11 and at least a part of the substrate section 13.

For example, the battery cell 11 has a curved flat shape. The flat shape represents a plate shape or an approximate plate shape, and two opposite main surfaces having a large surface area and surfaces connecting the two main surfaces may be a plane or a surface having a curved surface. In addition, a planar shape may be a polygonal shape such as a rectangular shape, and a shape such as a circular shape and an elliptical shape which have a curved line. The curved flat shape represents a shape including two curved main surfaces. For example, the battery cell 11 is curved in a thickness direction in such a manner that both side ends face a lower side, and the center between the both side ends faces an upper side. Although not illustrated, the battery cell 11 may be curved in the thickness direction in such a manner that both of the side ends face an upper side, and the center between both of the side ends faces a lower side, may be curved in the thickness direction in such a manner that a front end and a rear end face a lower side, and the center between the front end and the rear end faces an upper side, or may be curved in the thickness direction in such a manner that the front end and the rear end face an upper side, and the center between the front end and the rear end faces a lower side. The battery cell 11 may be a flexible member in which the degree of flexibility can be changed.

The curable resin composition sheet 12b' adheres to one side end surface 22b1, the other side end surface 22b2, and a lower end surface 22c of the battery cell 11 having the curved flat shape. The curable resin composition sheet 12b' is processed into a shape conforming to the close contact portion of the battery cell having the curved flat shape. For example, the curable resin composition sheet 12b' is processed as follows. A curable resin composition sheet processed into a strip shape is bent approximately perpendicularly at two sites to have an approximately U-shaped planar shape, and surface shapes with respect to the respective end surfaces of the one side end surface 22b1, the other side end surface 22b2, and the lower end surface 22c are processed to conform to shapes of the respective opposite end surfaces. In the curable resin composition sheet 12b', shape processing is easy, and the curable resin composition sheet 12b' can be also appropriately used with respect to the battery cell 11 having the curved flat shape.

2. Second Embodiment

A battery pack according to a second embodiment of the present disclosure will be described. The battery pack according to the second embodiment of the present disclosure has the same configuration as that of the battery pack (also including Modification Examples 1 to 3) according to the first embodiment as illustrated in FIGS. 1 and 2 except that an energy beam curable resin composition sheet is used as the curable resin composition sheet 12' instead of the thermosetting resin composition sheet.

Energy Beam Curable Resin Composition Sheet

The energy beam curable resin composition sheet is obtained by molding an energy beam curable resin composition into a sheet shape. The energy beam curable resin composition represents a resin composition that can be cured by irradiation with energy beams. The energy beams represent energy beams such as electron beams, ultraviolet rays, infrared rays, laser beams, visible rays, ionizing radiation (X-rays, α-rays, β-rays, γ-rays, and the like), microwaves, and high-frequency waves which are capable of causing a polymerization reaction of radicals, cations, anions, and the like. The energy beam curable resin composition may be used as a mixture with a different resin composition as necessary. For example, the energy beam curable resin composition may be used as a mixture with a curable resin composition such as a thermosetting resin composition. In addition, two or more kinds of energy beam curable resin compositions may be mixed and used. As the energy beam curable resin composition, it is preferable to use an ultraviolet curable resin composition that is cured with ultraviolet rays.

For example, the ultraviolet curable resin composition is composed of a monofunctional monomer, a difunctional monomer, a polyfunctional monomer, and the like. Specifically, the ultraviolet curable resin composition is obtained by using the following materials alone or by mixing a plurality of the following materials. Examples of the monofunctional monomer include carboxylic acids (acrylic acid), hydroxy compounds (2-hydroxyethyl acrylate, 2-hydroxypropyl acrylate, 4-hydroxybutyl acrylate), alkyl, alicyclic compounds (isobutyl acrylate, t-butyl acrylate, isooctyl acrylate, lauryl acrylate, stearyl acrylate, isobornyl acrylate, cyclohexyl acrylate), other functional monomers (2-methoxyethyl acrylate, methoxy ethylene glycol acrylate, 2-ethoxyethyl acrylate, tetrahydrofurfuryl acrylate, benzyl acrylate, ethyl carbitol acrylate, phenoxyethyl acrylate, N,N-dimethylaminoethyl acrylate, N,N-dimethylaminopropylacryl amide, N,N-dimethylacrylamide, acryloyl morpholine, N-isopropyl acrylamide, N,N-diethylacrylamide, N-vinyl pyrrolidone, 2-(perfluorooctyl)ethyl acrylate, 3-perfluorohexyl-2-hydroxypropyl acrylate, 3-perfluorooctyl-2-hydroxypropyl acrylate, 2-(perfluorodecyl)ethyl acrylate, 2-(perfluoro-3-methylbutyl)ethyl acrylate), 2,4,6-tribromophenol acrylate, 2,4,6-tribromophenol methacrylate, 2-(2,4,6-tribromophenoxy)ethyl acrylate, 2-ethylhexyl acrylate, and the like.

Examples of the difunctional monomer include tri(propyleneglycol) diacrylate, trimethylolpropane diallyl ether, urethane acrylate, and the like.

Examples of the polyfunctional monomer include trimethylolpropane triacrylate, dipentaerythritol penta- and hexa-acrylate, ditrimethylolpropane tetraacrylate, and the like.

Examples of initiators include 2,2-dimethoxy-1,2-diphenylethane-1-one, 1-hydroxy-cyclohexylphenylketone, 2-hydroxy-2-methyl-1-phenylpropane-1-one, and the like.

The energy beam curable resin composition sheet may contain fibrous material such as glass fiber. In this case, it is possible to suppress the occurrence of partial unevenness due to surface tension when the energy beam curable resin composition is cured, and thus this case is preferable. In addition, it is possible to suppress the occurrence of sagging in a resin due to gravity when the energy beam curable resin composition is softened, and thus this case is also preferable.

Method of Manufacturing Battery Pack

A method of manufacturing a battery pack according to second embodiment of the present disclosure will be described.

Process of Preparing Battery Element

A process of preparing a battery element is performed in the same manner as in the first embodiment to prepare the battery element 20.

Process of Preparing Battery Cell

Next, a process of preparing a battery cell is performed in the same manner as in the first embodiment to prepare the battery cell 11.

Process of Connecting Lead and the Like

Next, as is the case with the first embodiment, the leads 21a and 21b of the battery cell 11 are connected to the substrate section 13. According to this, components of the battery cell 11 and the substrate section 13 are connected, and thus an integrated assembly is obtained.

Process of Shape-Processing Curable Resin Composition Sheet

Next, as illustrated in FIG. 1, the curable resin composition sheet is processed into a shape conforming to the close contact portion so as to match the close contact portion. According to this, the curable resin composition sheet 12a' and the curable resin composition sheet 12b', which are shape-processed, are obtained. For example, the curable resin composition sheet is processed into a box shape having an opening in one surface, thereby obtaining the curable resin composition sheet 12a'. The curable resin composition sheet is processed into a strip shape, is bent to have an approximate U shape, and is processed into a shape conforming to a shape of the close contact portion including the one side end surface 22b1, the other side end surface 22b2, and the lower end surface 22c of the battery cell 11, thereby obtaining the curable resin composition sheet 12b'.

Process of Forming Resin Section

Next, the rigid substrate 13a of the substrate section 13 is disposed on the terrace portion 22a of the battery cell 11, and the curable resin composition sheet 12a', which is processed into the box shape having the opening in one surface, adheres to a part of the rigid substrate 13a and a part of the terrace portion 22a at the periphery of the rigid substrate 13a as temporary adhesion. Similarly, the curable resin composition sheet 12b', which is processed into an approximate U shape, adheres to the one side end surface 21b1, the other side end surface 21b2, and the lower end surface 21c of the battery cell 11 which constitute a close contact portion as temporary adhesion.

Next, the curable resin composition sheets 12a' and 12b' are irradiated with energy beams such as ultraviolet rays to cure the curable resin composition sheets 12a' and 12b'. According to this, the curable resin composition sheets 12a' and 12b', which are formed from the energy beam curable resin composition, are cured, whereby the resin section 12a and the resin section 12b are formed. According to this, the battery pack according to the second embodiment of the present disclosure is obtained.

In addition, Shore hardness and Vickers hardness of the resin sections 12a and 12b can be adjusted by adjusting the irradiation time with the energy beams such as ultraviolet rays, and the like. According to the hardness adjustment, the resin section 12 after curing can have a state corresponding to hardness according to usage. For example, the resin section 12 after curing can be allowed to have a shape having appropriate cushioning characteristics without hardness. It is possible to design the resin section 12 by selecting a flexible state or a state corresponding to hardness according to the specifications.

The battery pack according to the second embodiment has the same effect as in the first embodiment.

3. Third Embodiment

At least any one of the battery packs according to the first and second embodiments of the present disclosure may be used, for example, to be mounted on an apparatus such as an electronic apparatus, an electrically driven vehicle, and an electrical storage device, or to supply electric power thereto.

Examples of the electronic apparatus include a notebook computer, a PDA (portable information terminal), a cellular phone, a cordless phone handset, a video movie, a digital still camera, an electronic book, an electronic dictionary, a music player, a radio, a headphone, a gaming machine, a navigation system, a memory card, a pacemaker, a hearing aid, an electric tool, an electric shaver, a refrigerator, an air-conditioner, a television, a stereo, a water heater, a microwave oven, a dishwasher, a washing machine, a dryer, an illumination apparatus, a toy, a medical apparatus, a robot, a road conditioner, a signal apparatus, and the like.

In addition, examples of the electrically driven vehicle include a railway vehicle, a golf cart, an electrically driven cart, an electric vehicle (including a hybrid car), and the like, and the batteries are used as a driving power supply or an auxiliary power supply of the vehicles.

Examples of the electrical storage device include power supplies for electrical storage of buildings including a house, a power generating facility, and the like.

Hereinafter, among the above-described application examples, specific examples of the electrical storage system using an electrical storage device to which the battery pack of the present disclosure is applied will be described.

As the electrical storage system, the following configuration may be exemplified. A first electrical storage system is an electrical storage system in which an electrical storage device is charged by a power generator that performs power generation from renewable energy. A second electrical storage system is an electrical storage system that is provided with an electrical storage device and supplies electric power to an electronic apparatus that is connected to the electrical storage device. A third electrical storage system is an electronic apparatus to which electric power is supplied from an electrical storage device. This electrical storage system is executed as a system that realizes effective power supply in cooperation with an external power supply network.

In addition, a fourth electrical storage system is an electrically driven vehicle provided with a conversion device to which electric power is supplied from an electrical storage device and which converts the electric power to a driving force of a vehicle, and a control device that performs information processing relating to a vehicle control on the basis of information relating to the electrical storage device.

A fifth electrical storage system is a power system that is provided with an electric power information transmitting and receiving unit that transmits and receives electric power information to and from other apparatuses through a network, in which a charge and discharge control of the above-described electrical storage device is performed on the basis of the information that is received by the transmitting and receiving unit. A sixth electrical storage system is a power system to which electric power is supplied from the above-described electrical storage device or which supplies electric power from a power generator or a power network to the electrical storage device. Hereinafter, the electrical storage system will be described.

(3-1) Electrical Storage System in House as Application Example

An example in which an electrical storage device using the battery pack according to an embodiment of the present disclosure is applied to an electrical storage system for a house will be described with reference to FIG. 15. For example, in an electrical storage system 400 for a house 401, electric power is supplied to an electrical storage device 403 from a centralized power system 402 such as a thermal power generation 402a, a nuclear power generation 402b, a hydraulic power generation 402c through a power network 409, an information network 412, a smart meter 407, a power hub 408, and the like. In addition, electric power from an independent power supply such as an in-house power generator 404 is supplied to the electrical storage device 403. The electric power supplied to the electrical storage device 403 is stored. Electric power that is used in the house 401 is supplied by using the electrical storage device 403. The same electrical storage system may also be used with respect to a building without limitation to the house 401.

The power generator 404, power-consuming devices 405, the electrical storage device 403, a control device 410 that controls various devices, the smart meter 407, and sensors 411 that acquire various pieces of information are provided in the house 401. The respective devices are connected by the power network 409 and the information network 412. As the power generator 404, a solar cell, a fuel cell, or the like is used, and generated power is supplied to the power-consuming devices 405 and/or the electrical storage device 403. Examples of the power-consuming devices 405 include a refrigerator 405a, an air-conditioner 405b, a television receiver 405c, a bath 405d, and the like. In addition, examples of the power-consuming device 405 include an electrically driven vehicle 406. Examples of the electrically driven vehicle 406 include an electric vehicle 406a, a hybrid car 406b, and an electric bike 406c.

The battery pack according to the embodiment of the present disclosure is applied to the electrical storage device 403. The battery cell of the battery pack according to the embodiment of the present disclosure may be constituted, for example, by the above-described lithium ion secondary battery. The smart meter 407 has a function of measuring the amount of commercial power used and of transmitting this measured an amount used to a power company. The power network 409 may be any one of a DC power supply type, an AC power supply type, and a non-contact power supply type, or a combination of a plurality of these types.

Examples of the various sensors 411 include a motion sensing sensor, a luminance sensor, an object sensing sensor, a power-consumption sensor, a vibration sensor, a contact sensor, a temperature sensor, an infrared sensor, and the like. Information acquired by the various sensors 411 is transmitted to the control device 410. Weather conditions, conditions of human, or the like is grasped by the information transmitted from the sensors 411, and the power-consuming devices 405 are automatically controlled. Therefore, it is possible to minimize the energy-consumption. In addition, the control device 410 may transmit information related to the house 401 to an external power company or the like through the Internet.

Processes such as divergence of power lines and DC-AC conversion are performed by the power hub 408. As a communication method of the information network 412 connected to the control device 410, a method using a communication interface such as a universal asynchronous receiver-transceiver (UART: transmission and reception circuit for asynchronous serial communication), and a method using a sensor network compliant to a wireless communication standard such as Bluetooth, ZigBee, and Wi-Fi may be exemplified. The Bluetooth method is applied to multimedia communication and may perform one-to-multi connection communication. ZigBee uses a physical layer defined by the institute of electrical and electronics engineers (IEEE) 802.15.4. IEEE 802.15.4 is the name of a short-range wireless network standard called a personal area network (PAN) or wireless (W) PAN.

The control device 410 is connected to an external server 413. The server 413 may be controlled by any one of the house 401, the power company, and a service provider. As information that is transmitted to and received from the server 413, for example, power-consumption information, life pattern information, power rates, weather information, disaster information, and information related to power transactions may be exemplified. These pieces of information may be transmitted to and received from in-house power-consuming devices (for example, television receivers), but may be transmitted to and received from devices (for example, cellular phones, and the like) outside of the house. These pieces of information may be displayed on an apparatus such as a television receiver, a cellular phone, a personal digital assistant (PDA), and the like which have a display function.

The control device 410, which controls each unit, includes a central processing unit (CPU), a random access memory (RAM), a read only memory (ROM), and the like, and is accommodated in the electrical storage device 403 in this example. The control device 410 is connected to the electrical storage device 403, the in-house power generator 404, the power-consuming devices 405, the various sensors 411, and the server 413 through the information network 412, and has, for example, a function of adjusting the amount of commercial power used and the amount of power generation. Furthermore, in addition to this function, the control device 410 may have a function of performing power transactions in a power market, and the like.

As described above, the generated output of the in-house power generator 404 (photovoltaic generation and wind power generation) as well as that of the centralized power system 402 such as the thermal power generation 402a, the nuclear power generation 402b, and the hydraulic power generation 402c may be stored in the electrical storage device 403. Therefore, even when the generated output of the in-house power generator 404 varies, it is possible to make an amount of power that is transmitted to the outside uniform, or it is possible to control discharge as much as necessary. For example, a method of use described below may be considered. Specifically, the electric power that is obtained from the photovoltaic generation is stored in the electrical storage device 403, and inexpensive midnight power is also stored in the electrical storage device 403 at night, and then the electric power that is stored in the electrical storage device 403 is discharged to be used in a period of time at which a rate is expensive in the day time.

In addition, in this example, description has been given to an example in which the control device 410 is accommodated in the electrical storage device 403, but the control device 410 may be accommodated in the smart meter 407, or may be configured independently. Furthermore, the electrical storage system 400 may be used in a plurality of homes in an apartment house as targets, or may be used in a plurality of detached houses as targets.

(3-2) Electrical Storage System in Vehicle as Application Example

Figure 16:
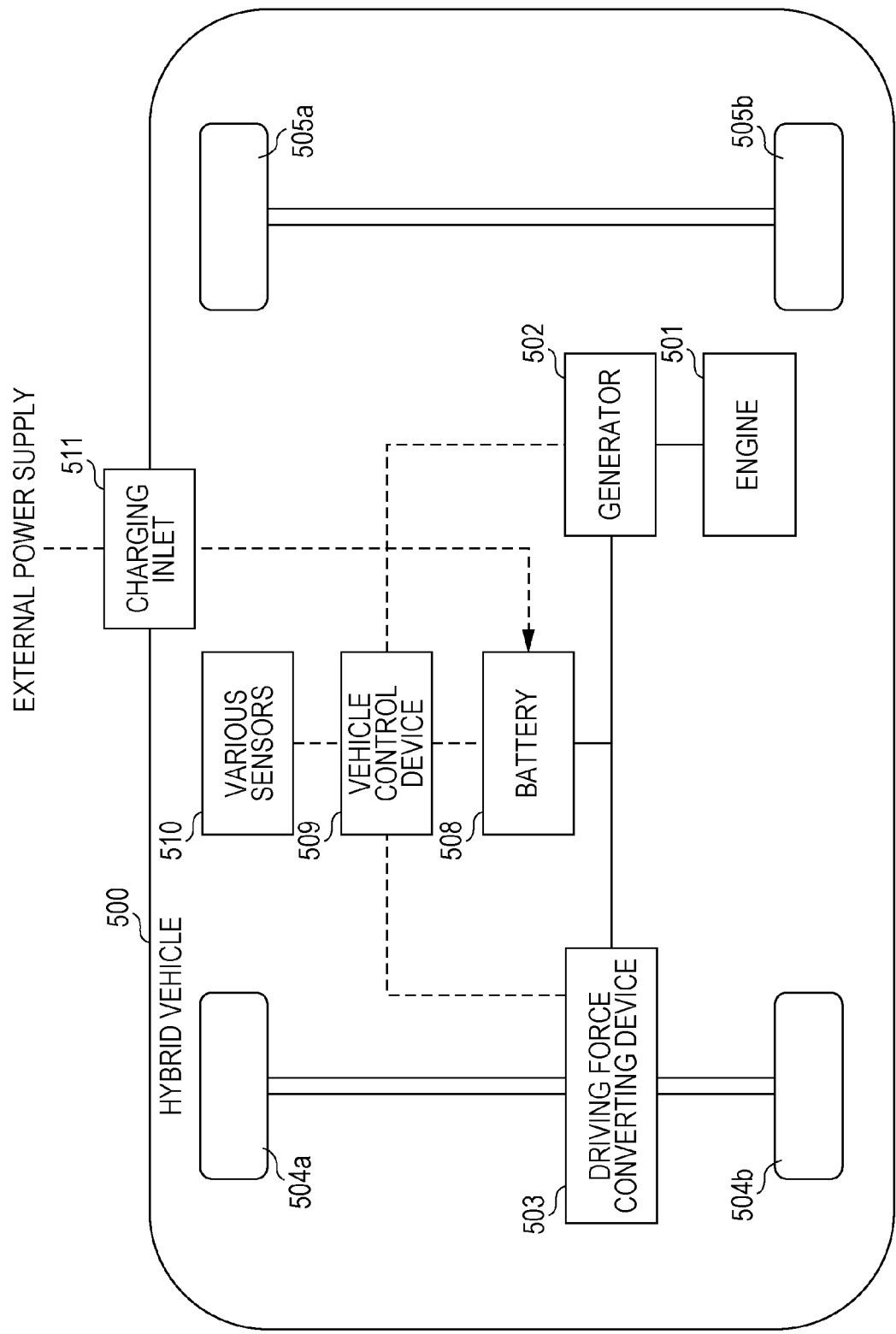
FIG. 16 is a schematic view schematically illustrating an example of a configuration of a hybrid car employing a series hybrid system to which the present disclosure is applied.

An example in which the present disclosure is applied to an electrical storage system for a vehicle will be described with reference to FIG. 16. FIG. 16 schematically illustrates a configuration example of a hybrid car that employs a series hybrid system to which the present disclosure is applied. The series hybrid system is a vehicle that travels with a power-driving force converting device by using electric power generated by a generator moved by an engine, or the electric power that is temporarily stored in a battery.

In the hybrid vehicle 500, an engine 501, a generator 502, a power-driving force converting device 503, a driving wheel 504a, a driving wheel 504b, a wheel 505a, a wheel 505b, a battery 508, a vehicle control device 509, various sensors 510, and a charging inlet 511 are mounted. As the battery 508, the above-described battery pack according to the embodiment of the present disclosure is applied.

The hybrid vehicle 500 travels using the power-driving force converting device 503 as a power source. An example of the power-driving force converting device 503 is a motor. The power-driving force converting device 503 operates with the electric power of the battery 508, and the torque of the power-driving force converting device 503 is transferred to the driving wheels 504a and 504b. In addition, the power-driving force converting device 503 may be applicable to an AC motor or a DC motor by using DC-AC conversion or invert conversion (AC-DC conversion) as necessary. The various sensors 510 control the engine speed or the opening degree (throttle opening degree) of a throttle valve (not illustrated) through the vehicle control device 509. Examples of the various sensors 510 include a speed sensor, an acceleration sensor, an engine speed sensor, and the like.

Torque of the engine 501 may be transferred to the generator 502, and electric power generated by the generator 502 using the torque may be stored in the battery 508.

When the hybrid vehicle 500 is decelerated with a brake mechanism (not illustrated), a resistance force during the deceleration is added to the power-driving force converting device 503 as torque, and regenerated electric power that is generated by the power-driving force converting device 503 due to the torque is stored in the battery 508.

When the battery 508 is connected to an external power supply outside the hybrid vehicle 500, electric power may be supplied to the battery 508 from the external power supply by using the charging inlet 511 as an input inlet and may store the supplied electric power.

Although not illustrated, an information processing device, which performs information processing related to vehicle control on the basis of information related to a secondary battery, may be provided. Examples of the information processing device include an information processing device that performs display of the residual amount of the battery on the basis of information regarding the residual amount of the battery, and the like.

In addition, hereinbefore, description has been given to the series hybrid car that travels with a motor by using electric power generated by a generator moved by an engine or the electric power that is temporarily stored in a battery as an example. However, the present disclosure may be effectively applied to a parallel hybrid car that uses both the output of the engine and the output of the motor as driving sources, and utilizes three types of traveling including traveling using the engine only, traveling using the motor only, and traveling using the engine and motor by appropriately changing these types. In addition, the present disclosure may be effectively applied with respect to a so-called electrically driven vehicle that travels using driving by a driving motor only without using the engine.

4. Fourth Embodiment

At least one of the battery packs according to the first and second embodiments may be used as a power supply of a wearable apparatus having a portable information terminal function, that is, a so-called wearable terminal. Examples of the wearable terminal include a wrist-watch type terminal, an eyeglass type terminal, and the like, but there is no limitation thereto.

Figure 17:
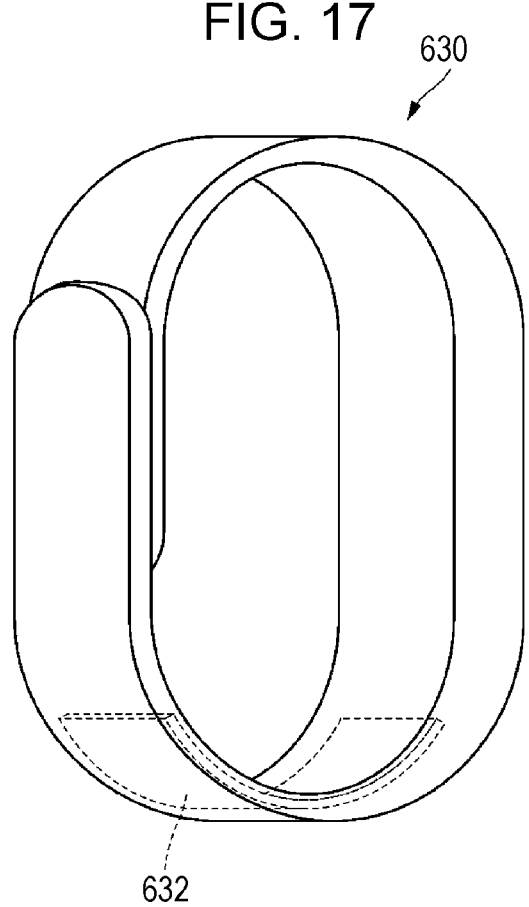
FIG. 17 is a perspective view illustrating an example of external appearance of a wearable apparatus in which a battery pack is embedded.

FIG. 17 illustrates an example of a battery pack-embedded wearable terminal. As illustrated in FIG. 17, a wearable terminal 630 according to the fourth embodiment of the present disclosure is a wrist-watch type terminal, and includes a battery pack 632 inside thereof. The wearable terminal 630 can be used in a state of being attached to a user. The wearable terminal 630 may be a deformable flexible terminal.

Figure 18:
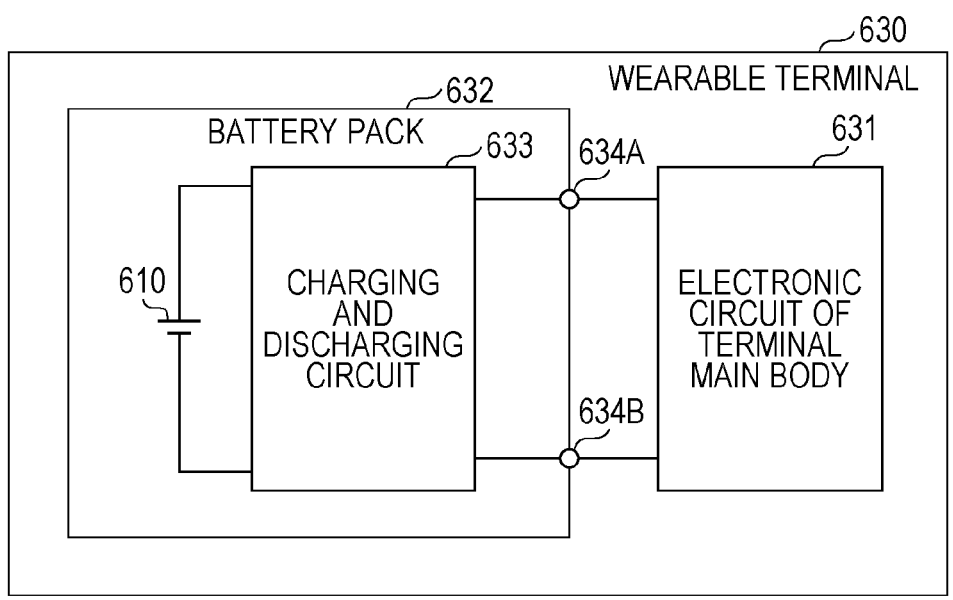
FIG. 18 is a block diagram illustrating an example of a configuration of a wearable terminal.

As illustrated in FIG. 18, the wearable terminal 630 according to the fourth embodiment of the present disclosure includes an electronic circuit 631 of an electronic apparatus main body, and a battery pack 632. The battery pack 632 is electrically connected to the electronic circuit 631. As the battery pack 632, the battery pack according to the first embodiment or the second embodiment may be used. For example, the wearable terminal 630 has a configuration in which the battery pack 632 is detachable by a user. However, the configuration of the wearable terminal 630 is not limited thereto, and the wearable terminal 630 may have a configuration in which the battery pack 632 is embedded inside the wearable terminal 630 so as not to allow the user to separate the battery pack 632 from the wearable terminal 630.

During charging of the battery pack 632, a positive electrode terminal 634A and a negative electrode terminal 634B of the battery pack 632 are connected to a positive electrode terminal and a negative electrode terminal of a charger (not illustrated), respectively. On the other hand, during discharging of the battery pack 632 (during use of the wearable terminal 630), the positive electrode terminal 634A and the negative electrode terminal 634B of the battery pack 632 are connected to a positive electrode terminal and a negative electrode terminal of the electronic circuit 631, respectively.

Electronic Circuit

For example, the electronic circuit 631 includes a CPU, a peripheral logic unit, an interface unit, a storage unit, and the like, and controls the entirety of the wearable terminal 630.

Battery Pack

The battery pack 632 includes a battery cell 610, and a charging and discharging circuit 633.

During charging, the charging and discharging circuit 633 control charging with respect to the battery cell 610. On the other hand, during discharging (that is, during use of the wearable terminal 630), the charging and discharging circuit 633 controls discharging with respect to the wearable terminal 630.

5. Other Embodiments

Hereinbefore, the respective embodiments of the present disclosure have been described, but the present disclosure is not limited thereto, and various modifications can be made in the range of the gist of the present disclosure.

For example, the numerical values, the structures, the shapes, the materials, the raw materials, the manufacturing processes, and the like, which are exemplified in the above-described embodiments, are illustrative only, and different dimensions, structures, shapes, materials, raw materials, manufacturing processes, and the like may be used as necessary.

In addition, the configurations, the methods, the processes, the shapes, the materials, the numerical values, and the like in the above-described embodiments may be combined with each other as long as the combination does not depart from the gist of the present disclosure. For example, the battery cell may a primary battery. For example, only one of the resin sections may be provided, and four or more of the resin sections that are separate from each other may be provided. In addition, a multi-layer curable resin composition sheet, in which single-layer curable resin composition sheets are laminated, may be used.

In addition, the present disclosure may employ the following configurations.

(1) A battery comprising:

a battery cell having main top and bottom surfaces, and a plurality of side surfaces; and at least one resin section including a cured resin that covers at least three of the plurality of side surfaces of the battery cell, but that does not cover substantially all of the top and bottom surfaces of the battery cell.

(2) The battery according to (1), wherein the resin section also covers at least one corner of adjacent side surfaces of the battery cell.

(3) The battery according to (1) or (2), wherein the resin sections have a flexible characteristic.

(4) The battery according to any one of (1) to (3), wherein at least one of the resin sections has a bent shape that conforms to a shape of one of the side surfaces of the battery cell.

(5) The battery according to any one of (1) to (4), wherein at least one of the resin sections covers a fourth side of the battery cell, and wherein a substrate section is formed between the resin section and the fourth side of the battery cell.

(6) The battery according to (5), wherein the resin section covering the fourth side of the battery cell has a box shape having an opening in one surface thereof, the resin section formed around an end of the battery cell.

(7) The battery according to any one of (1) to (6), wherein the resin sections include a fibrous filler material.

(8) The battery according to any one of (1) to (7), wherein the battery cell includes a cell main body including a battery element, and an exterior material that covers the battery element, the resin sections being formed on the exterior material.

(9) The battery according to (8), wherein the exterior material includes a fusion portion that is folded back to contact the cell main body.

(10) The battery according to (9), wherein a height (D) of at least one of the resin sections and a height (B) of the folded back part of the fusion portion satisfy the following relationship D>B.

(11) The battery according to (10), wherein at least part of one of the resin sections contacts and is formed between the folded back part of the fusion portion and the cell main body.

(12) The battery according to any one of (1) to (11), wherein a highest point of at least one of the resin sections does not exceed a highest point of a cell main body of the battery cell in a thickness direction thereof

(13) The battery according to any one of (1) to (12), wherein a thickness (A) of a cell main body of the battery cell and a height (D) of at least one of the resin sections satisfy the following relationship A≥D.

(14) A battery comprising:
a battery cell having main top and bottom surfaces, a plurality of side surfaces, and a plurality of corners; and
at least one resin section including a cured resin that covers portions of at least two corners of the battery cell, but that does not cover substantially all of the top and bottom surfaces of the battery cell.

(15) The battery according to (14), comprising a plurality of separate resin sections, each resin section covering a different corner of the battery cell.

(16) The battery according to (14) or (15), wherein at least one of the resin sections covers a side of the battery cell, and wherein a substrate section is formed between the resin section and the side of the battery cell.

(17) The battery according to any one of (14) to (16), wherein the resin sections include a fibrous filler material.

(18) A battery comprising:
a battery cell having a plurality of side surfaces and at least one curved surface connecting the side surfaces; and
at least one resin section that covers the side surfaces of the battery cell, but that does not cover at least substantially all of the curved surface of the battery cell.

(19) The battery according to (18), wherein the resin sections have a flexible characteristic.

(20) The battery according to (18) or (19), wherein the resin sections include a fibrous filler material.

(21) The battery according to any one of (18) to (20), wherein the curved surface is a curved plate shape or an approximate curved plate shape.

(22) An electronic device including the battery of (1).

(23) An electric vehicle including the battery of (1), and further comprising:
a conversion device to which electric power is supplied from the battery and which converts the electric power to a driving force of the electronic vehicle; and
a control device that performs information processing relating to a vehicle control on the basis of information relating to the battery.

(24) An electrical storage device including the battery of (1).

(25) An electrical storage system including the battery of (1), and further comprising an electric power information transmitting and receiving unit that transmits and receives electric power information to and from other apparatuses through a network,
wherein a charge and discharge control of the battery is performed on the basis of the information that is received by the transmitting and receiving unit.

(26) A wearable terminal including the battery of claim 1, and further comprising an electronic apparatus main body including an electronic circuit, the electronic circuit being electrically connected to the electronic circuit.

(27) The wearable terminal according to (26), wherein the battery is removable from the electronic apparatus main body.

(28) The wearable terminal according to (26) or (27), wherein the electronic apparatus main body has a curved shape.

(29) The wearable terminal according to any one of (26) to (28), wherein the electronic apparatus main body has flexible and deformable characteristics.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The application is claimed as follows:

1. A battery comprising:
a battery cell having main top and bottom surfaces, and a plurality of side surfaces; and
at least one resin section including a cured resin that covers at least three of the plurality of side surfaces of the battery cell, but that does not cover substantially all of the top and bottom surfaces of the battery cell,
wherein the battery cell includes a cell main body including a battery element, and an exterior material that covers the battery element, the resin sections being formed on the exterior material,
wherein the exterior material includes a fusion portion that is folded back to contact the cell main body,
wherein a height (D) of at least one of the resin sections and a height (B) of the folded back part of the fusion portion satisfy the following relationship D>B, and.
wherein at least part of one of the resin sections contacts and is formed between the folded back part of the fusion portion and the cell main body.

2. The battery according to claim 1, wherein the resin section also covers at least one corner of adjacent side surfaces of the battery cell.

3. The battery according to claim 1, wherein the resin sections have a flexible characteristic.

4. The battery according to claim 1, wherein at least one of the resin sections has a bent shape that conforms to a shape of one of the side surfaces of the battery cell.

5. The battery according to claim 1, wherein at least one of the resin sections covers a fourth side of the battery cell, and wherein a substrate section is formed between the resin section and the fourth side of the battery cell.

6. The battery according to claim 5, wherein the resin section covering the fourth side of the battery cell has a box shape having an opening in one surface thereof, the resin section formed around an end of the battery cell.

7. The battery according to claim 1, wherein the resin sections include a fibrous filler material.

8. The battery according to claim 1, wherein a highest point of at least one of the resin sections does not exceed a highest point of a cell main body of the battery cell in a thickness direction thereof.

9. The battery according to claim 1, wherein a thickness (A) of a cell main body of the battery cell and a height (D) of at least one of the resin sections satisfy the following relationship A≥D.

10. An electronic device including the battery of claim 1.

11. An electric vehicle including the battery of claim 1, and further comprising:
a conversion device to which electric power is supplied from the battery and which converts the electric power to a driving force of the electronic vehicle; and a control device that performs information processing relating to a vehicle control on the basis of information relating to the battery.

12. An electrical storage device including the battery of claim 1.

13. An electrical storage system including the battery of claim 1, and further comprising an electric power information transmitting and receiving unit that transmits and receives electric power information to and from other apparatuses through a network,
wherein a charge and discharge control of the battery is performed on the basis of the information that is received by the transmitting and receiving unit.

14. A wearable terminal including the battery of claim 1, and further comprising an electronic apparatus main body including an electronic circuit, the electronic circuit being electrically connected to the electronic circuit.

15. The wearable terminal according to claim 14, wherein the battery is removable from the electronic apparatus main body.

16. The wearable terminal according to claim 14, wherein the electronic apparatus main body has a curved shape.

17. The wearable terminal according to claim 14, wherein the electronic apparatus main body has flexible and deformable characteristics.

18. A battery comprising:
a battery cell having main top and bottom surfaces, a plurality of side surfaces, and a plurality of corners; and
at least one resin section including a cured resin that covers portions of at least two corners of the battery cell, but that does not cover substantially all of the top and bottom surfaces of the battery cell,
wherein the battery cell includes a cell main body including a battery element, and an exterior material that covers the battery element the resin sections being formed on the exterior material,
wherein the exterior material includes a fusion portion that is folded back to contact the cell main body,
wherein a height (D) of at least one of the resin sections and a height (B) of the folded back part of the fusion portion satisfy the following relationship D>B, and
wherein at least part of one of the resin sections contacts and is formed between the folded back part of the fusion portion and the cell main body.

19. The battery according to claim 18, comprising a plurality of separate resin sections, each resin section covering a different corner of the battery cell.

20. The battery according to claim 18, wherein at least one of the resin sections covers a side of the battery cell, and wherein a substrate section is formed between the resin section and the side of the battery cell.

21. The battery according to claim 18, wherein the resin sections include a fibrous filler material.

22. A battery comprising:
a battery cell having a plurality of side surfaces and at least one curved surface connecting the side surfaces; and
at least one resin section that covers the side surfaces of the battery cell, but that does not cover at least substantially all of the curved surface of the battery cell,
wherein the battery cell includes a cell main body including a battery element., and an exterior material that covers the battery element, the resin sections being formed on the exterior material,
wherein the exterior material includes a fusion portion that is folded back to contact the cell main body,
wherein a height (D) of at least one of the resin sections and a height (B) of the folded back art of the fusion portion satisfy the following relationship D>B and
wherein at least part of one of the resin sections contacts and is formed between the folded back part of the fusion portion and the cell main body.

23. The battery according to claim 22, wherein the resin sections have a flexible characteristic.

24. The battery according to claim 22, wherein the resin sections include a fibrous filler material.

25. The battery according to claim 22, wherein the curved surface is a curved plate shape or an approximate curved plate shape.

* * * * *